United States Patent [19]

Furuya

[11] Patent Number: 5,708,528
[45] Date of Patent: Jan. 13, 1998

[54] MULTISCREEN DISPLAY AND PROCESS FOR ASSEMBLING THE SAME

[75] Inventor: Keizo Furuya, Saitama-ken, Japan

[73] Assignee: Kabushiki Kaisha Toshiba, Kawasaki, Japan

[21] Appl. No.: 620,170

[22] Filed: Mar. 22, 1996

Related U.S. Application Data

[62] Division of Ser. No. 326,370, Oct. 20, 1994.

[30] Foreign Application Priority Data

| Oct. 21, 1993 | [JP] | Japan | 5-263643 |
| Dec. 24, 1993 | [JP] | Japan | 5-328908 |
| Mar. 31, 1994 | [JP] | Japan | 6-087886 |
| Jun. 24, 1994 | [JP] | Japan | 6-143587 |

[51] Int. Cl.$^6$ .................................. G03B 21/56
[52] U.S. Cl. .................. 359/457; 359/443; 359/453; 359/460
[58] Field of Search ............... 359/443, 453, 359/455, 456, 457, 460

[56] References Cited

U.S. PATENT DOCUMENTS

| 4,866,530 | 9/1989 | Kalua . | |
| 4,919,518 | 4/1990 | Ogino et al. | 350/128 |
| 5,185,677 | 2/1993 | Honda et al. | 359/460 |
| 5,206,760 | 4/1993 | Nakashima et al. | 359/457 |
| 5,317,449 | 5/1994 | Furuno et al. | 359/443 |
| 5,548,350 | 8/1996 | Yamada et al. | 348/839 |

FOREIGN PATENT DOCUMENTS

| 0523427 | 1/1993 | European Pat. Off. . |
| 2248005 | 3/1992 | United Kingdom . |

*Primary Examiner*—Daniel P. Malley
*Attorney, Agent, or Firm*—Cushman, Darby & Cushman IP Group of Pillsbury, Madison & Sutro LLP

[57] ABSTRACT

Respective unit displays forming a multiscreen display are divided into two halves of a front half cabinet containing a screen part and a rear half cabinet containing a light box part. In using, the rear half cabinet is fixed in a predetermined position in the front half cabinet. In conveying and storing, the rear half cabinet can be contained in the front half cabnet. Further, in fitting the screen, the screen is fixed as pressed against the fitting frame by using wires or the Fresnel lenses forming the screen are fitted to the fitting frames for the respective projecting units.

10 Claims, 39 Drawing Sheets

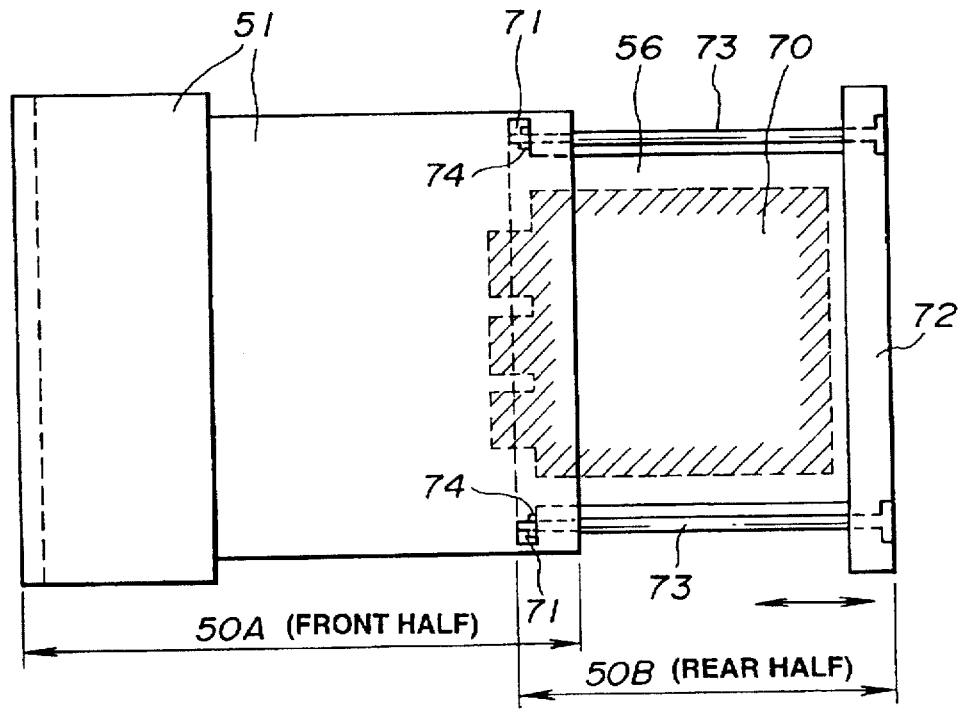
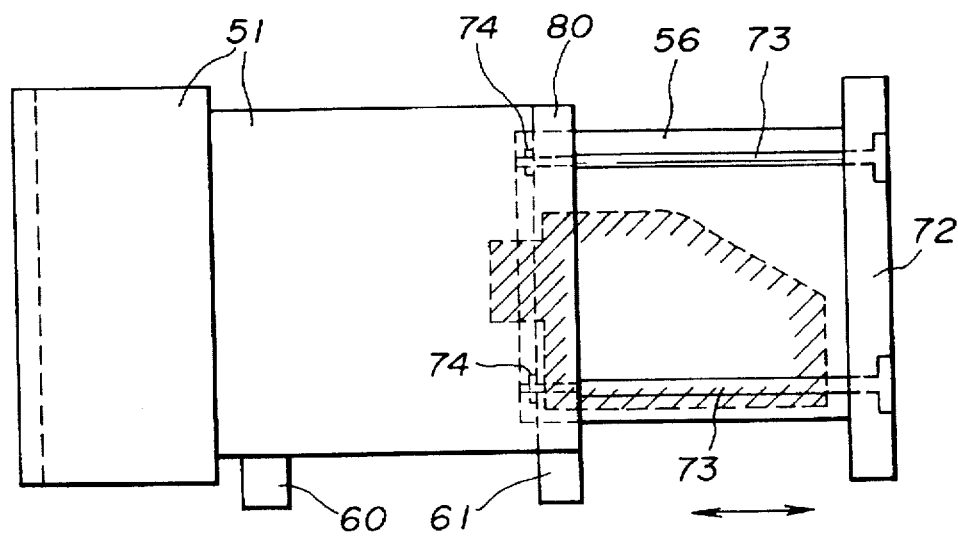

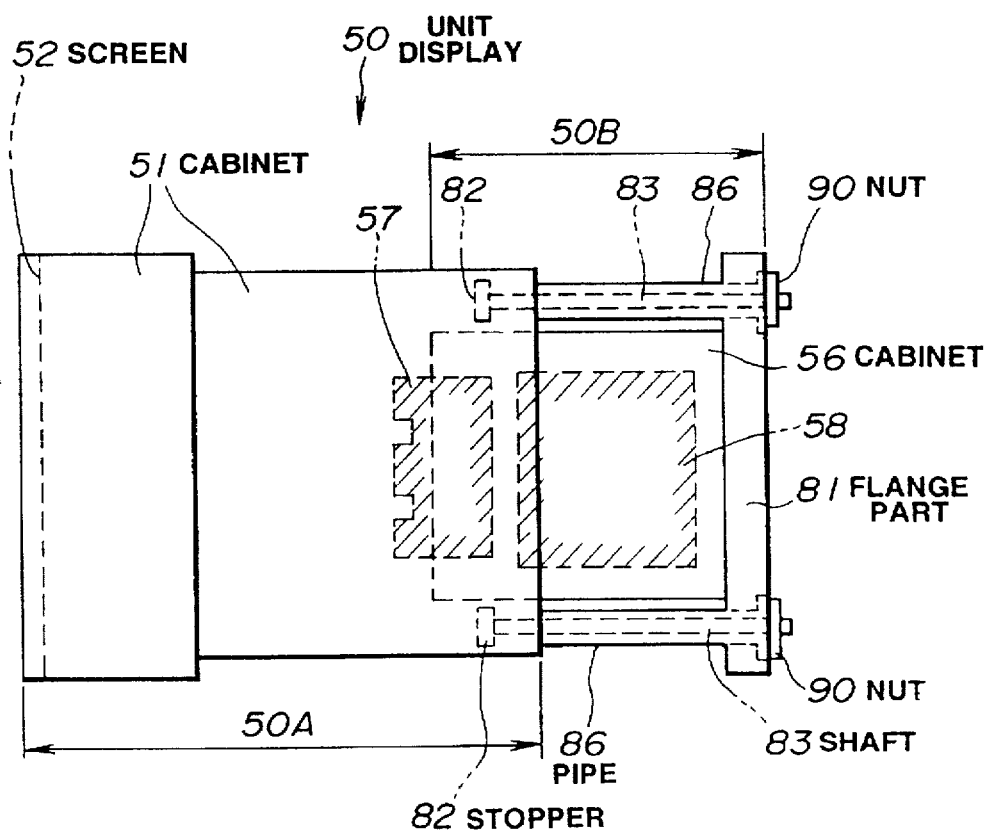
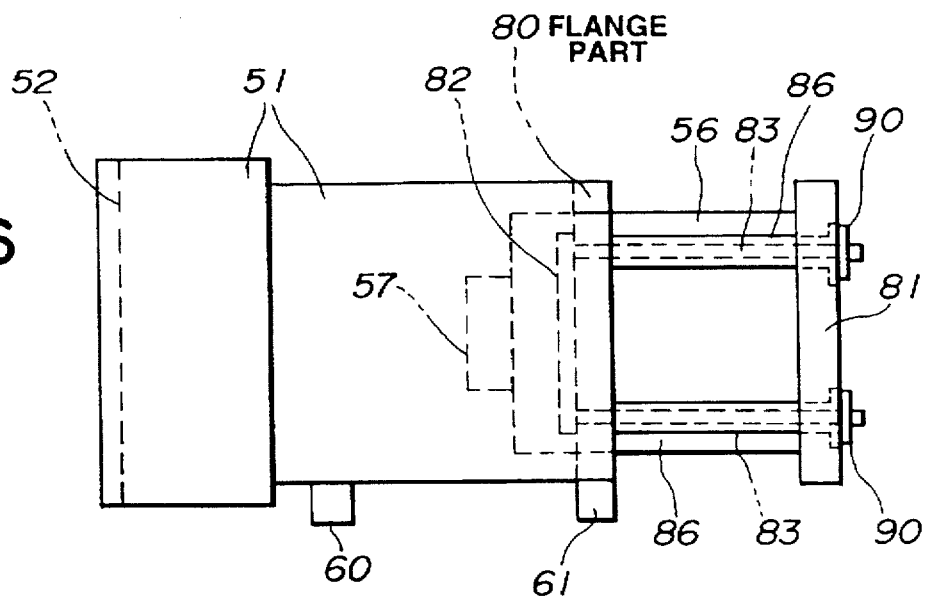

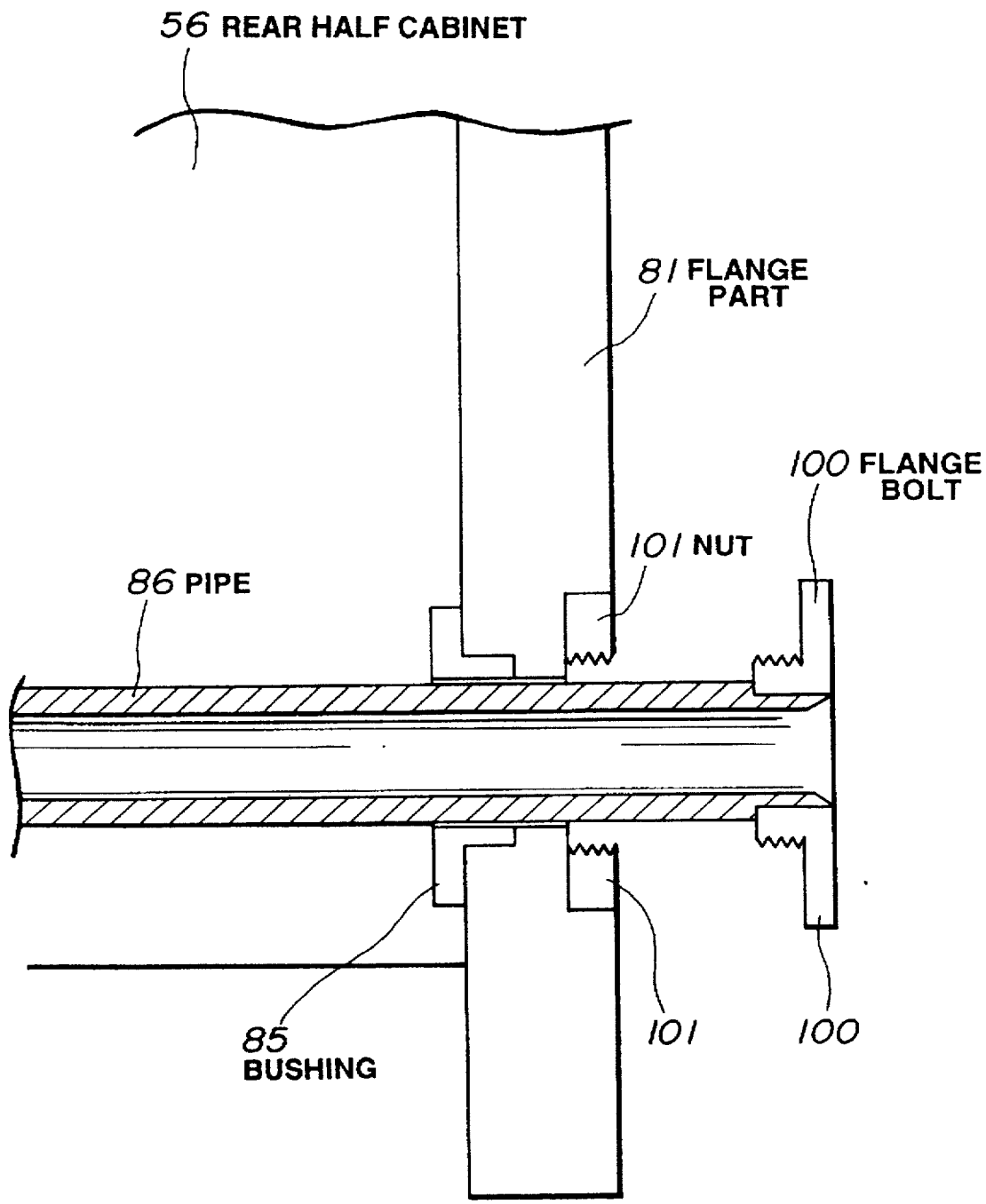

MULTISCREEN DISPLAY AND PROCESS FOR ASSEMBLING THE SAME

This is a division of application Ser. No. 08/326,370, filed Oct. 20, 1994.

SPECIFICATION

BACKGROUND OF THE INVENTION

1. Field of the Invention

This invention relates to a wide-screened multiscreen display made by heaping a plurality of unit displays (called also cube projection displays) in vertical and horizontal directions and a process for assembling the same so that particularly the operations of conveying and heaping the cabinets of respective unit displays, the operations of the adjustment and maintenance after heaping the cabinets may be efficient, the space efficiency in conveying and storing the cabinets may be improved and the width of the boundary (joint width) between the screens of the respective unit displays may be made small.

2. Description of the Related Arts

Conventional multiscreen displays are of a front surface projecting type wherein an image light from a projecting unit is projected from the front surface of the screen and a back surface projecting type wherein an image light is projected from the back surface of the screen. However, the back surface type multiscreen display which is low in the influence of the surrounding light is generally prevalent. In such back surface type multiscreen display, the screen is divided vertically and horizontally to set a plurality of zones so that image lights from a plurality of projecting units may be projected onto the respective plurality of zones, individual plurality of images may be thereby displayed and one image may be displayed as divided into a plurality of images.

The conventional multiscreen display can be formed to obtain a screen of a large picture by arranging a plurality of (9 in the drawing) unit displays 1 in the vertical and horizontal directions as shown in FIG. 53.

FIG. 54 shows an appearance view of an example of the unit display. FIG. 55 shows a vertically sectioned view of the same.

As shown in these figures, the unit display 1 has a screen fitting frame 4 arranged on the front surface of a cabinet 2 and is formed by containing within the cabinet 2 a screen 3 and light box parts consisting of optical system parts 5 for projecting an image light onto the screen 3 on the back surface and a chassis part 6. Connecting metal fixtures 7 and 8 for fixing the respective upper and lower unit displays 1 with each other when a plurality of unit displays 1 are heaped up in multiple steps are fitted on the upper and lower surfaces of the outside of the cabinet 2. The above mentioned screen 3 is formed of a Fresnel lens 3B on the inner surface side and a lenticular lens 3A on the front surface side.

FIG. 56 shows an example of the above mentioned unit displays as heaped up in steps. The upper and lower unit displays 1 are connected with each other through bolts 9 by connecting metal fixtures 7 and 8 arranged above and below the cabinets.

When thus installed, in case the unit displays 1 are heaped up so as to be multiple, the entire cabinet long in the depth will have to be lifted and connected above and below while being fitted in the fixed position to a danger and heavy labor.

Also, the heavy object will have to be slid little by little to be fitted toward front, rear, right and left, taking a long time.

Further, in such structure heaped up in steps, the respective unit displays will be heaped up by their self-weight in the vertical direction and therefore the gap of the joint of the vertical sets will be able to be made small but such gap A as is shown in FIG. 57 will be likely to be produced in the horizontal direction.

For this countermeasure, when a plurality (4 in the drawing) of unit displays are heaped up in steps in the vertical and horizontal directions, for example, as in FIG. 57, if outer peripheral angles 10 and 11 are combined to fasten a bolt (indicated by the arrow) from outside, it will be difficult to perfectly eliminate the gap A.

Such problem will occur when the weight of the unit display 1 is heavy, its contour is large and the unit display 1 is connected or fastened from outside the cabinet. As a result, the quality of the multi-picture will be deteriorated.

Further, when the unit displays are heaped up in steps, it will be necessary to work with such machine as a crane. The operation will have to be large and the internal space of the installing place will have to be wide.

The depth and contour of the cabinet will be large and the conveying efficiency will be low. As a multi-picture is made, such many unit displays as 4, 9 or 16 units will be conveyed at once and therefore, the volume of the unit display itself will have to be reduced to elevate the conveying efficiency. (There will be a case that they can not be conveyed at once.)

The operations (such as adjusting the chassis and optical system) after the operation of heaping them in steps and the operation (such as replacing deteriorated internal parts) in the service are all made from the back surface side.

When the cabinet is used with a multi-picture for a long time, dust will be often deposited on the front surface and back surface of the screen. In the case of wiping off this dust, when the depth of the cabinet is as in the past, for example, if the light box part is intended to be pulled out and wiped, it will be hard and inconvenient for the hand to reach the part.

As in the above, the assembling operation to heap up the unit displays in steps so as to be of a multi-screen type is dangerous and complicated, a wide space is required for the installing place and it is difficult to get the installing precision. Further, the contour of each unit display is so large that there are problems that the conveying efficiency is low and it is inconvenient to operate in the service or the like.

FIG. 58 shows a formation of another example of the unit display 1. FIG. 59 shows a partly sectioned view in line Z—Z in FIG. 58.

In each unit display 1, as shown in FIG. 58, a rear projector 12 is arranged within a cabinet 2, the peripheral edge of a screen 3 is pressed with a screen fitting frame 4 on the front side of the cabinet 2 and further the periphery of the screen 3 is pressed with an L-shaped metal fixture 13. The screen fitting frame 4 is secured so as to be integral with the cabinet 2.

As shown in FIG. 59, the screen 3 is a Fresnel lens 3B on the back surface and a lenticular lens 3A on the front surface so that lights may be once collected by the Fresnel lens 3B and then divided on the right and left by the lenticular lens. When the screen 3 is dropped into the screen fitting frame 4 and is pressed against and fixed to the front end part (receiving part) of the cabinet 2 with the L-shaped metal fixture 13, the screen 3 will be fitted. Then, the L-shaped metal fixture 13 will be fixed to the screen fitting frame 4 with screws 14 so that the screen 3 may not be removed.

Now, the above mentioned screen 3 fixing method has the following defects (1) to (3):

(1) As the screws 14 are used to fit the L-shaped metal fixture 13 to the screen fitting frame 4, the thickness L1 of the screen fitting frame 4 will require the thickness of the screw part.

(2) Also, as the L-shaped metal fixture 13 holds the screen 3 only on the outer periphery, in case the screen fitting frame 4 is instantaneously transformed to be diamond-shaped by such external force (particularly in the diagonal direction) as of conveyance or handling, the screen 3 will be likely to be disengaged out of the L-shaped metal fixture 13. Particularly, the lenticular lens 3A is so considerably thinner than the lenticular lens 3B that the lenticular lens 3A part will be likely to be disengaged out of the L-shaped metal fixture. Therefore, the dimension L2 of the L-shaped metal fixture 13 must be at least wider than the dimension L3 of the screen receiving part of the cabinet 2. In order that the screen 3 may not be disengaged out of the screen fitting frame 4, the dimension L2 of the L-shaped metal fixture 13 must be made larger and, at the same time, the dimension L3 on the cabinet 2 side must be set to be as large. Further, the transformation of the central part of the screen 3 is provided with no inhibiting force and is left free. For example, even if the L-shaped metal fixture 6 is replaced with a smaller one after the installation in a set place, the dimension L3 on the cabinet 2 side and the dimension L1 on the screen fitting frame 4 side will still remain large and, as a result, when the unit displays are heaped in steps, the effective picture will be small.

From the above, the dimension L4 of the peripheral edge of the screen 3 will become very large and, when the unit displays 1 are heaped up in several steps as in FIG. 53 to be of a multiscreen type, the width M of the joint by the combination will become large, the information amount of the picture will become small and, at the same time, the picture will become ugly.

(3) In addition, in the multiscreen, in order to elevate the quality of the entire picture, the linearity of the convergence must be adjusted between the respective unit displays 1 but there is nor criterion in such adjustment.

FIG. 60 is a perspective view of another conventional example of the multiscreen display. FIG. 61 is a sectioned view on line Y—Y of FIG. 60.

In FIG. 60, a screen 16 is arranged on the front surface of a cabinet 15 and a plurality (four in the drawing) of rear projectors 12 are arranged within the cabinet 15. In this formation, as a method of eliminating the joint of the lenticular lenses, the rear projector 12 and screen 16 are separately made, only the screen 16 part is made a jointless formation of the lenticular lens and the plurality of rear projectors 12 are separately combined into a turret so that the optical axes of the Fresnel lenses of the screen may be aligned to be a multiscreen.

To concretely explain in FIG. 61, a plurality (four in the drawing) of the Fresnel lenses 16B corresponding to the respective rear projectors 12 are arranged in the rear of the lenticular lens 16 made one and are further lined with a thick strong transparent plate 16C (for example, an acrylic plate) (to function as a supporting plate) in the rear, the thick transparent plate 16C and a shielding plate 16D are jointed and fastened to be integral by inserting the thin shielding plate 16D between the end surfaces of the respective thick transparent plates 16C and the four Fresnel lenses 16B are held between the above described lenticular lens 16A and this integral transparent plate 16 to form an integral screen of a multipicture. Then, the plurality of rear projectors 12 are arranged as combined in a turret by a separate body 17 so that the optical axes of the respective Fresnel lenses 16B may be aligned to make a multiscreen.

However, in the conventional examples in FIGS. 60 and 61, there are the following defects (1) to (3):

(1) The multiscreen is formed of the lenticular lens 16A, Fresnel lens 16C and shielding plate. 16D, is complicated and is expensive.

(2) The Fresnel lens 16B is only inserted, is poor in the environmental stability, slips and deflects. (Therefore, as another countermeasure, a part of the Fresnel lens 16B is nailed to the transparent plate 16C with fine nails so as to be reinforced. However, a deflection (such as an environment variation difference by the plate thickness difference) will occur between the Fresnel lens 16B and transparent plate 16 and the picture quality will reduce.

(3) Further, as the screen part and the rear projector 12 are separately assembled (installed) on the spot (in the setting place), when multidisplayed, it will be difficult to precisely align all optical axes.

FIG. 62 shows another example of the screen fitting. In this example, one lenticular lens and a plurality of Fresnel lenses are made an integral screen of a multipicture by using a fitting frame.

In FIG. 62, the reference numeral 20 represents a front surface part unit of a multiscreen display. In this front surface part unit 20, a screen 30 is fitted by a screen fitting frame 21.

In this screen, four upper, lower, left and right regions 31, 32, 33 and 34 are set and image lights are projected from the four respective projecting units.

FIG. 63 is a sectioned view of the front surface part unit 20 in FIG. 62.

As shown in FIG. 63, in the screen 30 shown in FIG. 62, Fresnel lenses 37 are arranged in the four upper, lower, left and right regions 31, 32, 33 and 34 between the thickest transparent plate (such as, for example, an acrylic plate) 35 and the thinnest lenticular lens 36.

The Fresnel lenses 37 weaken the diffusion of the image lights from the respective plurality of the projecting units and lead them to the lenticular lens 36 which forms a vertically striped lens on the front surface side of a semi-transparent plate, images the image lights from the Fresnel lenses 37 and further diffuses them to the right and left. A black painting 38 is applied to the periphery of the Fresnel lens 37 to prevent the adjacent projecting units from interfering with lights.

FIG. 64 is an explanatory view for explaining to prevent the projecting units from interfering with image lights.

In FIG. 64, as lights are absorbed by the black painting 38 between the Fresnel lenses 37, when the slip of the image lights from the upper and lower (or right and left) projecting units is little, no interference with the image lights by different projecting units will occur. However, as the transparent plate 35 is formed of one plate, as shown by the solid lines B31 and B32, when the lag of the image lights from the projecting units is large, the image lights will trespass the black painting 38 and an interference will occur. Therefore, the boundary line of the projected image will have to be controlled by controlling the luster size of the projecting unit and it will be a very difficult control in multiusing some signals different in the frequency characteristics as switched.

In case the Fresnel lenses 37 are forcibly fixed to the transparent plate 35 with nails, the ratio of the expansion and contraction and the progressing velocity will be made different by the plate thickness difference between the transparent plate 35 and the Fresnel lenses 37. As a result, a strain will be produced between the transparent plate 35 and the Fresnel lenses 37 and therefore this screen will be able to be used only in such place wherein the temperature variation is little as a room. In addition, as the four Fresnel lenses 37 are fixed into one from the first, such handlability as moving, conveying and installing will be low. Further, as the transparent plate 35 and screen fitting frame 81 have a sufficient strength, they will be heavy and the handlability will be lower.

SUMMARY OF THE INVENTION

An object of the present invention is to provide a multiscreen display and a process for assembling the same wherein the conveying operation, installing operation and the adjusting operation and servicing operation after the installation are made efficient.

Another object of the present invention is to provide a multiscreen display wherein the dimensions of the parts for fixing the screen are kept minimum, further the screen holding force is improved, when the unit displays are heaped up in steps, the joint will be made minimum, the information amount of the picture will be made large and the ugliness will be able to be reduced, the operability for the linearity adjustment of the convergence can be improved and the assembling operability when set is high.

Still another object of the present invention is to provide a multiscreen display wherein, when the slip of the image lights from the projecting units is large, the interference with the image lights will be able to be prevented and, in case the picture is made large, the handlability will be able to be improved.

The first invention is a multiscreen display formed by arranging in the vertical and horizontal directions a predetermined number of unit displays containing within cabinets screen parts and light box parts expanding and projecting image lights to these screen parts, wherein the above mentioned unit displays are divided into a first part containing the above mentioned screen parts and a second part containing the above mentioned light box parts and further the above mentioned first part and second part are respectively provided with connecting part so as to be connectable with each other by a locking means.

According to the first invention, as the unit displays are divided into the first part and second part, the weight and volume will become half and the conveying operation, installing operation and the adjusting operation and servicing operation after the installing will be made safely and easily. Particularly, the first part compoess only a screen part and other function parts are concentrated in the second part, the assembling operation can be made to eliminate the gap between the screens in heaping up the cabinets in steps to make a multiscreen with only the first part and the assembling operation can be made easy.

The second invention is a multiscreen display formed by arranging in the vertical and horizontal directions a predetermined number of unit displays containing within cabinets screen parts and light box parts expanding and projecting image lights to these screen parts, characterized by comprising:

a first cabinet containing the above mentioned screen parts;

a second cabinet containing the above mentioned light box parts, set so that the contour dimension may be smaller than the inside dimension of the above mentioned first cabinet and movable and containable inside the above mentioned first cabinet;

a plurality of shafts movable forward and rearward with respect to the above mentioned first cabinet;

a means provided at one end of said shaft to regulate the rearward movement;

a fixing means for passing and fixing the other end of the above mentioned shaft to the above mentioned second cabinet;

a guide means removably secured in the rear end part to the rear end of the above mentioned second cabinet, guiding the movement of the above mentioned shaft and of a fixed length shorter than the length of the above mentioned shaft, for fixing in a fixed position the above mentioned second cabinet with respect to the above mentioned first cabinet; and a securing means for removably securing the rear end part of this guide means to the rear end of the above mentioned second cabinet.

According to the second invention, by using the plurality of shafts and moving the second cabinet together with the movement of the shaft, the second cabinet can be moved and contained inside the first cabinet. The greater part of the second cabinet is contained in the space of the first cabinet so as to be of a shape and volume convenient to convey and the number of conveyances can be reduced. The conveying operation, installing operation, adjusting operation and servicing operation can be easily made. In order that the second cabinet may be pulled out of the first cabinet and fixed in a fixed position, such guide means as a pipe is used in addition to the above mentioned plurality of shafts and the rear end of this guide means is removably secured to the rear end part of the second cabinet by a securing means. Further, lest the above mentioned second cabinet should be removed out of the fixed position to move rearward, the second cabinet can be kept in the fixed position by fixing the rear end of the shaft led out rearward by the above mentioned guide means to the above mentioned second cabinet by such fixing means as a nut.

In the servicing operation or the like, when the fixing of the shaft rear end and the second cabinet is released and the second cabinet is only pulled out rearward, the shaft regulated in the movement by the first cabinet will be smoothly guided along the guide means as secured to the second cabinet and the second cabinet will be able to be smoothly pulled out of the first cabinet.

The third invention is a multiscreen display formed by arranging in the vertical and horizontal directions a predetermined number of unit displays made by fixing screens consisting of lenticular lenses and Fresnel lenses to screen fixing frames, wherein a plurality of wires are stretched on the front surface side of the above mentioned screen in the above mentioned unit display, the above mentioned screen is pressed against the above mentioned screen fitting frame and further pads pressing the peripheral edge of the above mentioned screen are arranged on the above mentioned screen fitting frame.

According to the third invention, as the plurality of wires are stretched on the front surface side of the screen and the screen is fixed to the screen fixing frame, the screen can be inhibited from floating and deflecting and can be positively fixed and further, as the peripheral edge of the screen is pressed by the pads, the screen can be fixed more positively.

The multiscreen display according to the fourth invention is characterized by comprising a plurality of Fresnel lenses, a plurality of Fresnel lens fitting frames formed like frames, having the above mentioned plurality of Fresnel lenses respectively fitted on the front surface side, having image lights from a plurality of projecting units respectively projected from the back surface side and connected and assembled with each other by a connecting means provided on the side surface, a lenticular lens and a lenticular lens fitting frame formed like a frame, having the above mentioned lenticular lens fitted on the front surface side and having the above mentioned assembled plurality of Fresnel lens fitting frames inserted from the back surface side.

According to the fourth invention, even when the slip of the image lights from the projecting units is large, the interference with the image lights will be able to be prevented by the plurality of Fresnel lens fitting frames and, as the plurality of Fresnel lens fitting frames are connected and assembled with each other by the connecting means provided on the side surface, in case the picture is made large, the handlability will be able to be improved.

BRIEF DESCRIPTION OF THE DRAWINGS

FIG. 4 shows a unit display in the second embodiment of a multiscreen display of the present invention and is a plan view and side view showing a formation example in the case that the rear half can be contained in the front half and a light box of a separate body can be put into and out of the movable side.

FIG. 6 shows a unit display in the third embodiment of a multiscreen display of the present invention and is a plan view and side view of a formation example in which the rear half can be slidably contained in the front half.

FIG. 7 is a vertically sectioned view showing a locking structure of a cabinet and pipe in the rear half part in FIG. 6.

DETAILED DESCRIPTION OF THE PREFERRED EMBODIMENTS

The embodiments shall be explained with reference to the drawings.

Figure 1:
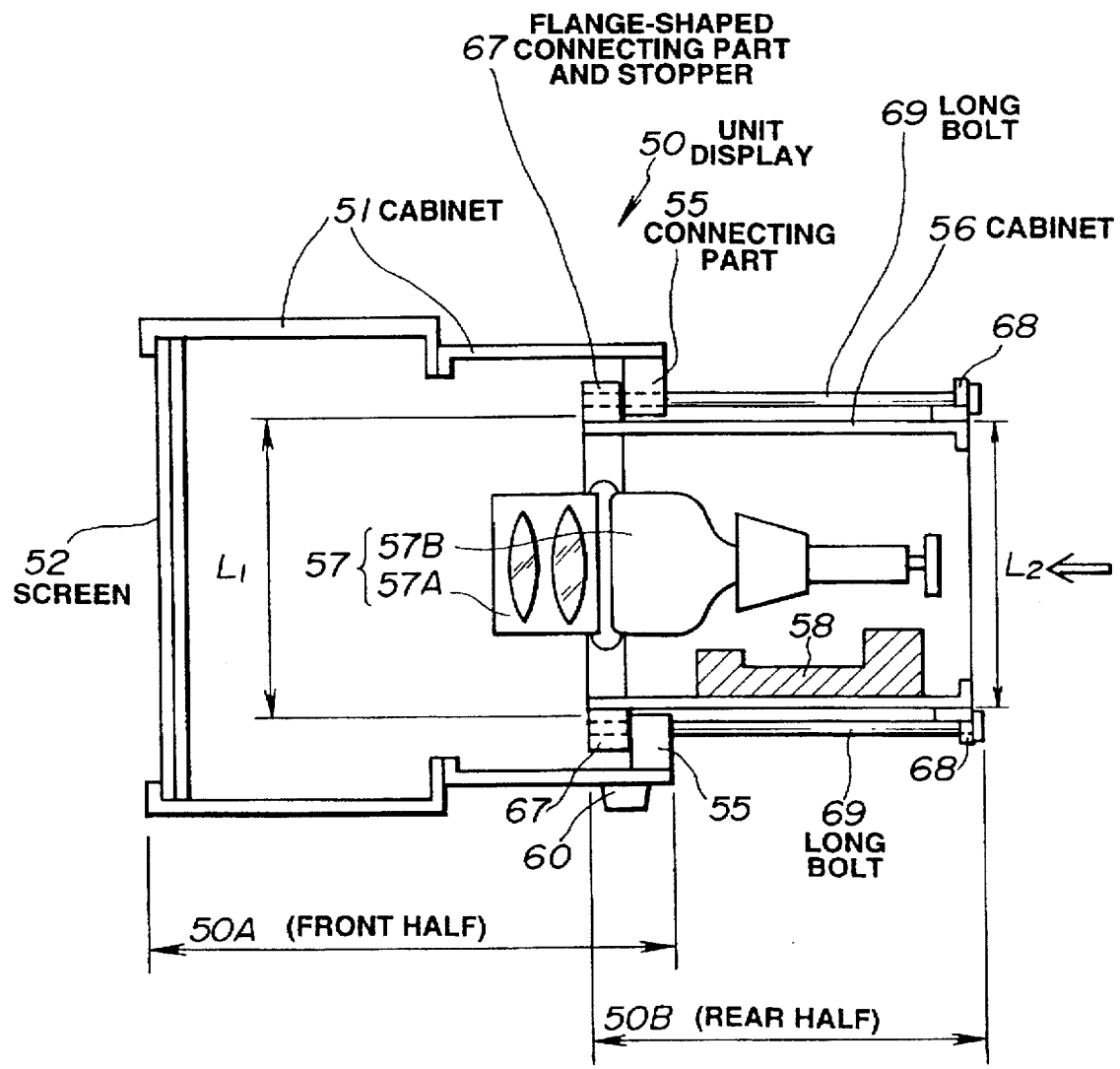
FIG. 1 shows a unit display in the first embodiment of a multiscreen display of the present invention and is a vertically sectioned view as the rear half is connected to the front half.

FIG. 1 shows a unit display in the first embodiment of a multiscreen display of the present invention and is a vertically sectioned view as the rear half is connected to the front half.

Figure 2:
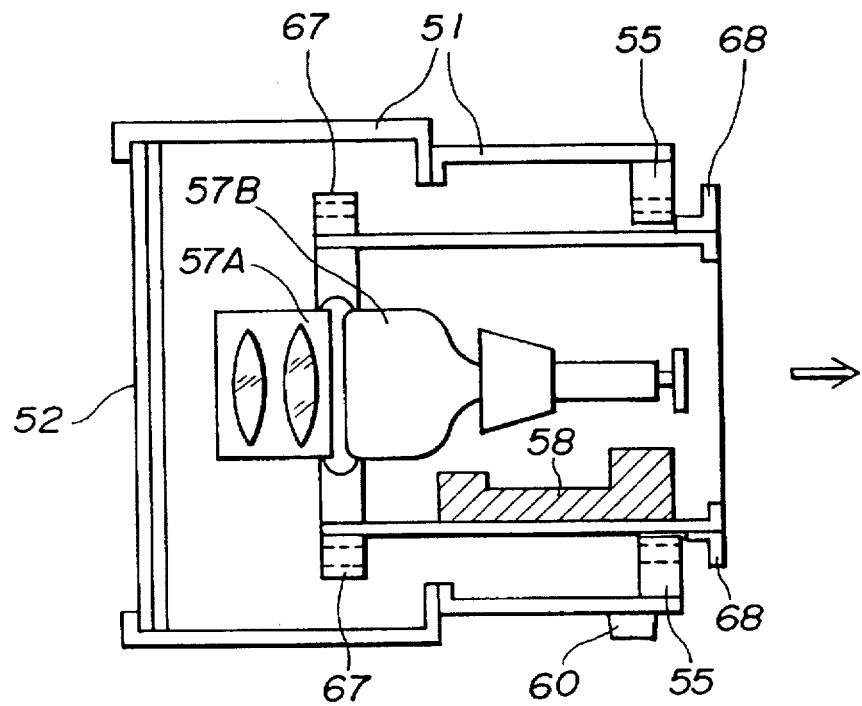
FIG. 2 shows the unit display in FIG. 1 and is a vertically sectioned view showing the rear half as contained inside the front half.

FIG. 2 is a vertically sectioned view showing as the rear half is contained inside the front half.

In FIG. 1, a unit display 50 is formed as divided into the front half 50A and rear half 50B. In the front half 50A, only a screen 52 is combined in a cabinet 51 of the front half and a connecting part 55 for connecting with the rear half 50B is provided on the inner periphery of the rear end part of the cabinet 51. On the other hand, in the rear half 50B, such image projecting parts as optical system parts 57 and chassis parts 58 are combined in a cabinet 56 in the rear half and a flange-shaped connecting part and stopper 67 for connecting with the front half 50A is provided on the outer periphery of the front end part of the cabinet 56. A left part 60 is arranged on the lower surface of the front half 50A.

Figure 3:
FIG. 3 is a view showing an example of the long bolt in FIG. 1.

Here, the rear inner dimension $L_1$ of the front half 50A is set to be larger than the outer dimension $L_2$ of the rear (greater part) of the rear half 50B. In the case of such moving as conveying, as shown in FIG. 2, the rear half 50B will be able to be contained within the front half 50A. Therefore, the above mentioned flange-shaped connecting part and stopper 67 enters the inside of the front half 50A and the rear half 50B is made movable forward and rearward. From the contained state in FIG. 2, when the rear end part of the rear half 50B is pulled out of the front half 50A, the flange-shaped connecting part and stopper 67 of the rear half 50B comes into contact with the connecting part 55 of the front half 50A and, in this contact state, the connecting part 55 and the flange-shaped connecting part and stopper 67 are connected and fixed through a long bolt 69, the state in FIG. 1 will be made. Flange parts 68 are arranged on the upper and lower surfaces of the rear end part of the rear half 50B and such long bolt 69 as is shown in FIG. 3 is inserted through the above mentioned connecting parts 55 and 67 from this flange part 68 so as to be fixed.

The connecting bolt 69 is removed from the front half 50A and rear half 50B integrally connected through the connecting bolt 69 and the rear half 50B is moved as shown by the arrow in FIG. 1 and is contained within the front half 50A so that the state in FIG. 2 may be made from the state in FIG. 1.

Figure 5:
FIG. 5 is a view showing an example of the long bolt in FIG. 4.

FIG. 4 shows a unit display in the second embodiment of a unit display of the present invention. (a) represents a plan view and (b) represents a side view. A separate light box 70 is formed in the rear half 50B which is a movable side so as to be able to be freely put into and out of the front half (screen part) 50A which is a fixed side. So that the above mentioned rear half 50B may be fixed in a fixed position with respect to the above mentioned front half 50A, flange parts 71 are provided in the front end part of the cabinet 56 of the above mentioned rear half 50B so as to project outside as shown in FIG. 4(a), nuts 74 are embedded in the flange parts 71, flange parts 80 are provided on the inner surface of the rear end part of the above mentioned front half 50A so as to project inside as shown in FIG. 4(b), through holes of the same diameter as the inside diameter of the nut are provided in the positions corresponding to the positions of the nuts 74 of the flange parts 80, further a flange part 72 is provided on the outer periphery of the rear end part of the above mentioned rear half 50B so as to project outside and a through hole (of a diameter larger than the above mentioned nut diameter) through which the large diameter part of the long bolt 73 will pass is provided in the flange part 72. The above mentioned long bolt 73 is screw-threaded at the tip as shown in FIG. 5, is of a large diameter in the part other than the screw thread part and is of a stepped shape.

In order that the above mentioned rear half 50B may be fixed in a predetermined position with respect to the above mentioned front half 50A, when the above mentioned rear half 50B is pulled out to the maximum, the above mentioned flange parts 71 will come into contact with the above mentioned flange parts 80 and the above mentioned rear half 50B will be regulated not to move rearward from the predetermined position. When the above mentioned long bolts 73 are passed through the through holes of the flange part 72 in the rear of the above mentioned rear half 50B from the back surface side, are further passed through the through holes of the rear flange parts 80 of the above mentioned front half 50A and are at last screwed with the nuts 74 of the front flange parts 71, the step parts of the above mentioned bolts 73 will stop on the rear end surface of the above mentioned front half 50A, the flange parts 80 at the rear end of the above mentioned front half 50A will be fastened with the screw parts at the tips of the above mentioned bolts 73 and the above mentioned nuts 74 screwed to the screw parts and the above mentioned front half 50A and rear half 50B will be positively connected and fixed. By the way, at the time of a maintenance service, when the light box 70 is taken out of the cabinet 56, parts will be able to be replaced. The reference numerals 60 and 61 represent leg parts.

By the way, in the embodiment in FIG. 4, the case that the light box 70 is separate has been explained. However, this embodiment can be applied also to the case of a structure in which the cabinet 56 is simultaneously the light box.

FIG. 6 shows a unit display in the third embodiment of a multiscreen display of the present invention and shows a formation example of a unit display in which the rear half can be contained in the front half so that the loaded volume as to be conveyed may be reduced. (a) represents a plan view and (b) represent a side view. The same elements as in FIG. 1 shall be explained with the same reference numerals attached.

In FIG. 6, the rear half 50B containing light box parts comprising optical system parts 57 and chassis parts 58 within the cabinet 56 is formed so as to be able to be slidably contained into or pulled out of the inside of the front half 50A containing the screen 52 within the cabinet 51 by using a plurality (4 in the drawing) of shafts. The optical system parts 57 and chassis parts 58 are mounted within the cabinet 56 of the rear half 50B. FIGS. 6(a) and (b) show the rear half 50B as pulled out to a predetermined position in the rear. In this position, the optical system parts 57 are set in the projecting position optically optimum to the screen 52.

As shown in FIG. 6(b), a flange part 80 is provided to project inside on the inner surface of the rear end part of the front half 50A and a flange part 81 is provided to project outside on the outer periphery of the rear end part of the rear half 50B. Four shafts 83 are arranged through the flange parts 80 and 81. A common stopper 82 is secured to one end part (front end part through the flange part 80) of each of the two upper and lower shafts 83. The other end parts of the shafts 83 are passed through the flange part 81 through pipes 86 as guide means and are fixed to this flange part 81 by such fixing means 90 as nuts. The front end of the pipe 86 as a guide means is in contact with the rear end part of the cabinet 51 of the front half part 50A and the rear end of the pipe 86 is secured to the rear end part of the flange part 81 of the cabinet 56 of the rear half part 50B by later described securing means. This securing means shall be explained in FIGS. 7 to 9. The details of the locking structure of the shaft 83, pipe 86 and flange parts 80 and 81 in the predetermined position shown in FIG. 6 shall be described with reference to FIG. 8.

FIG. 7 is a vertically sectioned view showing a means for securing the rear end of the above mentioned pipe 86 to the rear end part of the flange part 81 of the cabinet 56 of the rear half part 50B. In order to improve the workability in assembling, the above described pipe 86, fixing metal fixture 87 and fixing screw 88 are made integral.

In FIG. 7, first of all, a flanged bolt (male screw) 100 is fixed to the rear end of the pipe 86 by such means as calking. On the other hand, a nut (female screw) 101 screwing with the above mentioned bolt 100 is fitted to the flange part 81 of the cabinet 56 of the rear half part by such means as welding. Here, the inside diameter of the pipe 86 is made somewhat larger than the outside diameter of the later described shaft 83 and a bushing 85 fitted to the outside diameter of this pipe 86 is fitted to the flange part 81 of the cabinet 56.

Figure 8:
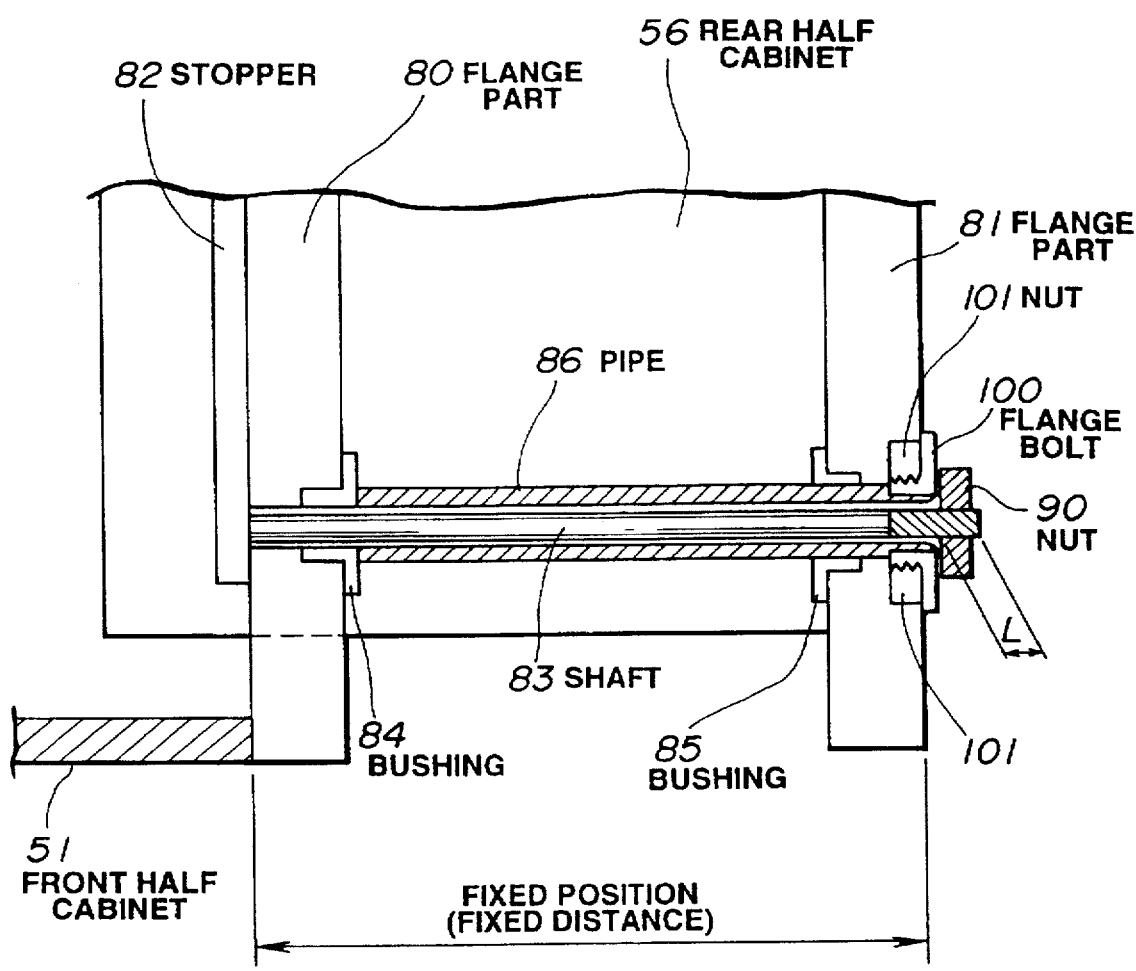
FIG. 8 is a vertically sectioned view showing a locking structure of a cabinet in the front half part and a cabinet, pipe and shaft in the rear half part in FIG. 6.

FIG. 8 is a sectioned view showing the details of a locking structure of the shaft 83 and flange parts 80 and 81 in FIG. 6(b).

As shown in FIG. 8, the shaft 83 and stopper 82 are connected and fixed by welding or the like. A bushing 84 fitted to the shaft diameter is fitted to the flange part 80 in the rear of the cabinet 51 of the front half 50A. When the shaft 83 is inserted into this bushing 84, the shaft 83 will become smoothly movable forward and rearward. When the cabinet 56 of the rear half 50B is in a predetermined position (fixed distance: an optically normal position) with respect to the cabinet 51 of the front half 50A, the shaft 83 will be able to be projected rearward until the stopper 82 fixed to the shaft 83 collides with the flange part 80 in the rear of the cabinet 51 of the front half.

Then, the cabinet 56 of the rear half is placed in a predetermined position with the cabinet 51 of the front half so that, when the shaft 83 is inserted into the pipe 86, the rear end of this shaft may project by a dimension L out of the pipe length and a screw thread somewhat longer than this dimension L is formed at the rear end of the shaft 83. After the shaft 83 is inserted into the pipe 86 from the rear of the flange part 81, the flanged bolt 100 secured to the shaft 83 is screwed to the nut 101 fixed to the flange part 81 and thereby the pipe 86 is connected and fixed to the flange part 81 in the rear of the cabinet 56. At last, the nut 90 is screwed to the shaft 83. When the fastening is completed, the flange part of the flanged bolt 100 will be fastened so as to be pressed by the nut 90. At the same time, At the same time, the shaft 83 itself will be pulled out rearward and fixed by the fastening of the nut 90. (That is to say, the flange part 80 in the rear of the cabinet 51 of the front half will be held and fixed by the stopper 82 and the front end of the pipe 86.) Therefore, as a result, the flange part 80 in the rear of the cabinet 51 of the front half and the flange part 81 in the rear of the cabinet 56 of the rear half will be always able to keep a predetermined position corresponding to the pipe length.

In the above structure, the operation procedures of "inserting the pipe 86→fastening the flanged bolt 100→fastening the nut 90" are only carried out all from the back surface side of the cabinet, therefore, even after the cabinets are heaped in steps, after the cabinet 56 in the rear half is pulled rearward out of the contained state (the state in FIG. 11), the cabinet will be able to be set in the normal position all by the operations from the back surface side.

As the flanged bolt 100 is secured to the rear end of the pipe 86, there are advantages that the assembling operation will be simple and the number of the component parts will be few.

Figure 9:
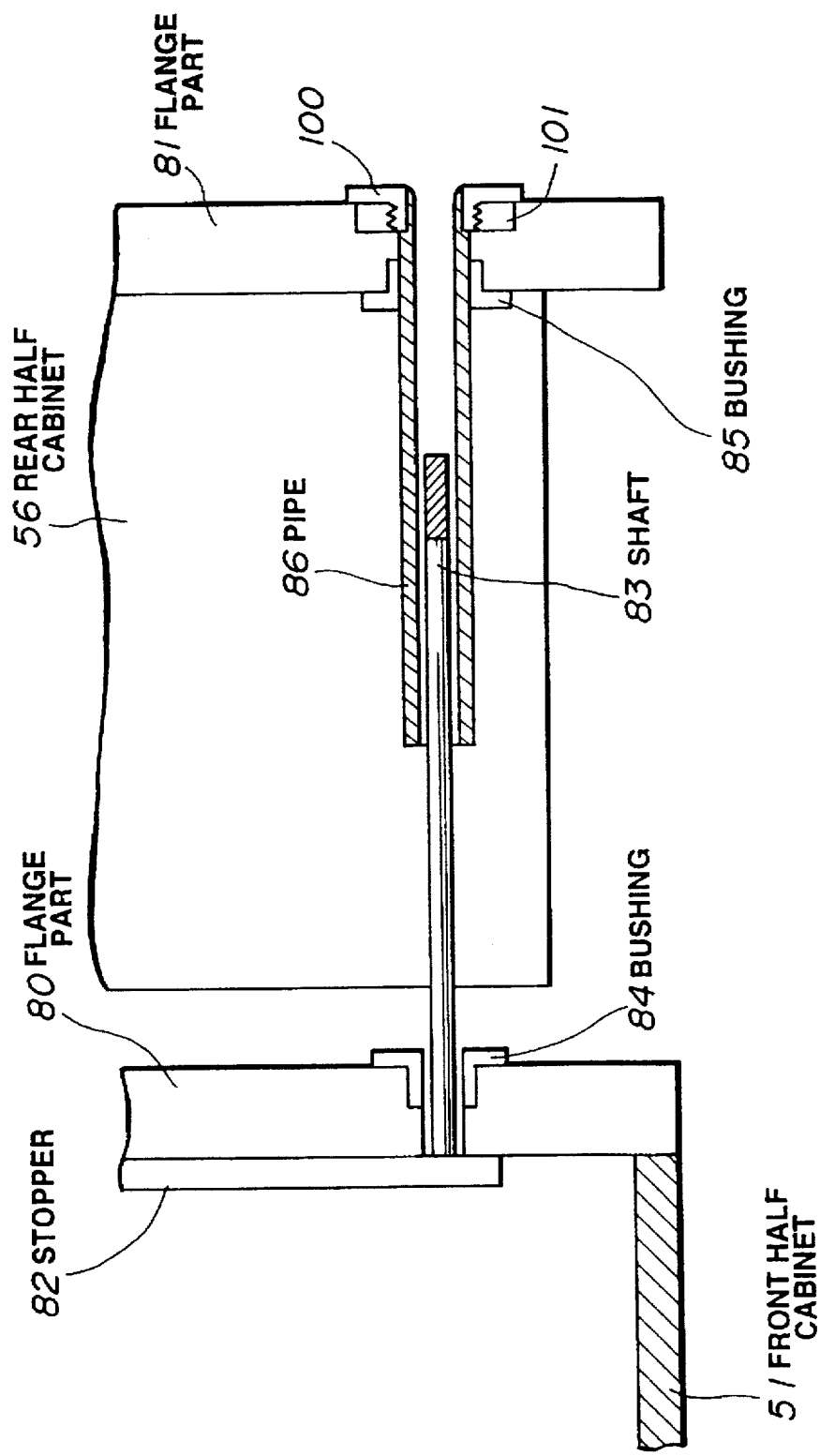
FIG. 9 is a vertically sectioned view as the nut is removed from the state in FIG. 8 and the cabinet in the rear half part is pulled out rearward.
Figure 10:
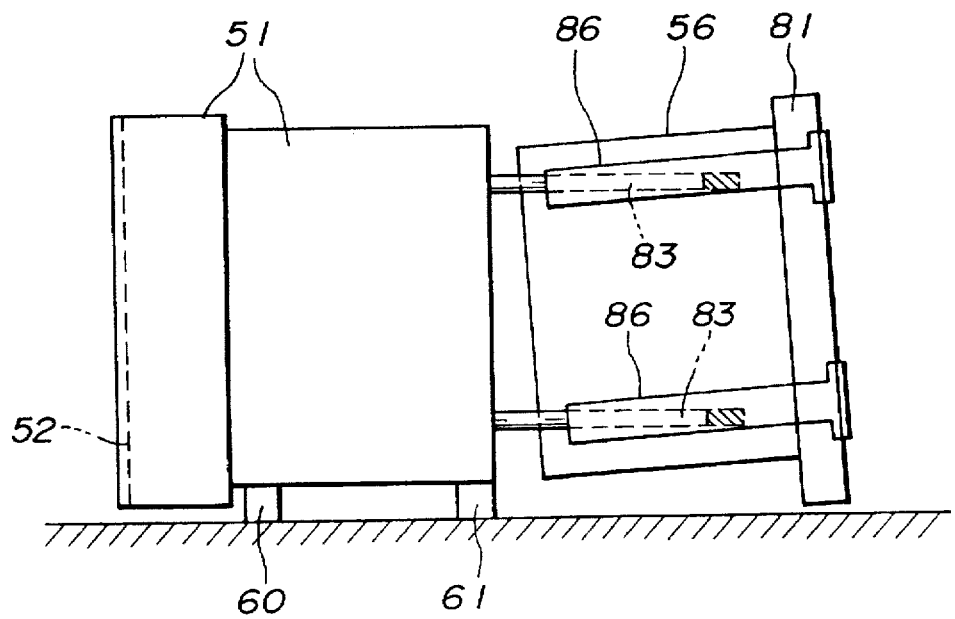
FIG. 10 is a side view of a unit display showing the state in FIG. 9.

Further, as an additional effect, as the pipe 86 and the cabinet 56 in the rear half part are made integral by the screwed connection of the bolt 100 and nut 101, when the cabinet 56 of the rear half part is pulled out in a maintenance service, even if the nut 90 is removed from the rear end of the shaft 3 and the cabinet 56 is pulled out rearward, as shown in FIG. 9, the pipe 86 will remain connected and fixed to the flange part 81 of the cabinet 56, even if the cabinet 56 is pulled out further rearward, the shaft 83 will remain locked within the pipe 86 and, by the rigidity of the pipe 86, as shown in FIG. 10, the front end of the cabinet 56 pulled out will only incline but will not touch the floor and the cabinet 56 will be able to be smoothly pulled out with the pipe 86 as a guide.

When conveyed or the like, the cabinet 56 will be able to be moved and contained within the cabinet 51.

Figure 11:
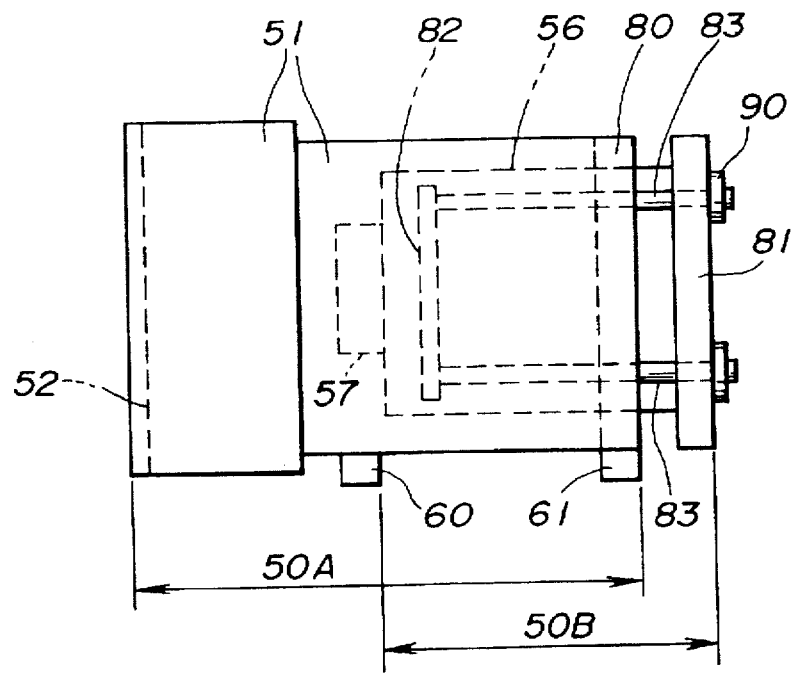
FIG. 11 is a side view showing a unit display in FIG. 6 as a cabinet in the rear half is slid and contained inside a cabinet in the front half.
Figure 12:
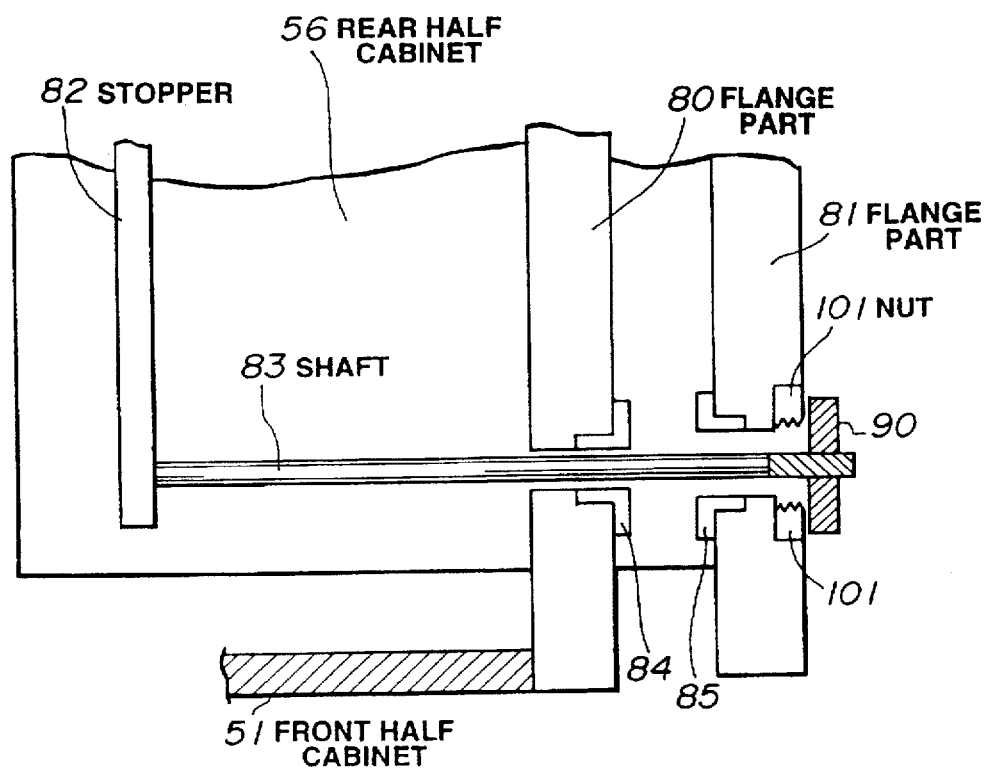
FIG. 12 is a vertically sectioned view showing an essential part in the state in FIG. 11.

FIG. 11 is a side view showing the rear half 50B as slid and contained inside the front half 50A. FIG. 12 is a vertically sectioned view showing an essential part in the state in FIG. 11.

In order to thus move and contain the cabinet, as in FIG. 6(b), the nut 90 is removed from the fixed state in the predetermined position, further the connection of the flanged bolt 100 at the rear end of the pipe 86 and the nut 101 fixed to the flanged part 81 is disconnected, the pipe 86 is pulled out, then the nut 90 is fitted again to the rear end of the shaft 83 and the cabinet 56 may be moved to be pushed into the cabinet 51.

When the cabinet is delivered after the production, when it is conveyed in contained state as shown in FIG. 11 to an installing place, it will be arranged in a predetermined place and then the cabinet 56 of the rear half part will be pulled out of the cabinet 51 of the front half part and, when the stopper 82 comes into contact with the front end of the flange part 80 as regulated, the nut 90 will be removed from the rear end of the shaft 83, the pipe 86 will be inserted from the rear of the flange part 86 so as to be inserted through the pipe, the flanged bolt 100 at the rear end of the pipe 86 will be connected and secured to the nut 101 fixed to the flange part 81 and then the nut 90 will be again screwed to the rear end of the shaft 83 so that the cabinet 56 of the rear half part may be fixed in the predetermined position as shown in FIG. 6(b).

Figure 14:
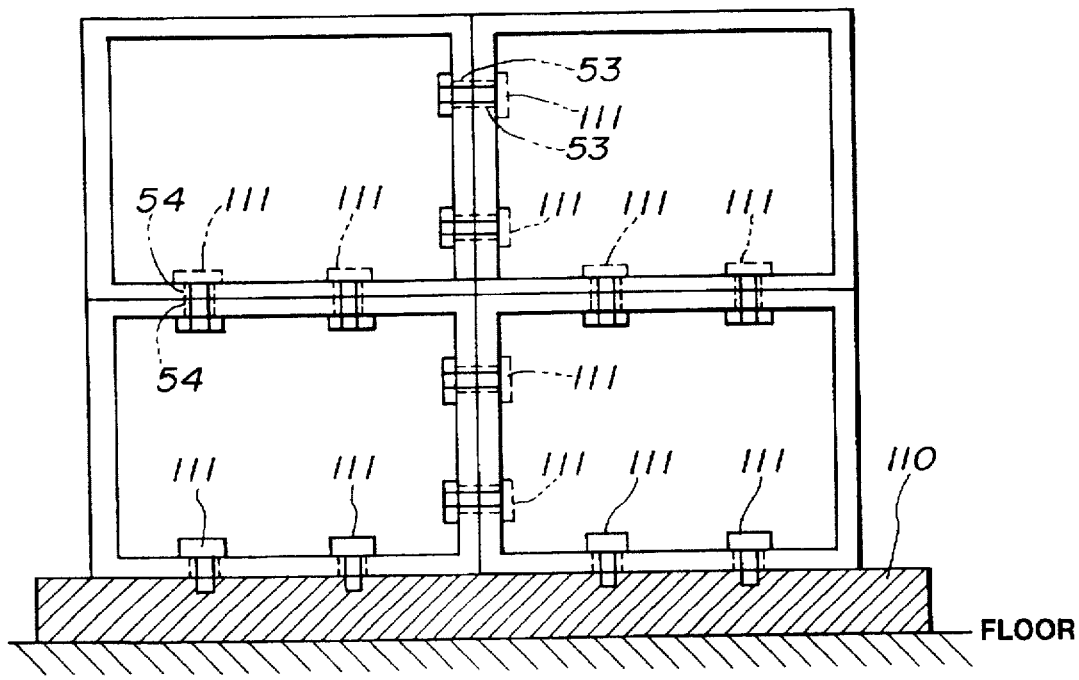
FIG. 14 is a front view of FIG. 13.
Figure 13:
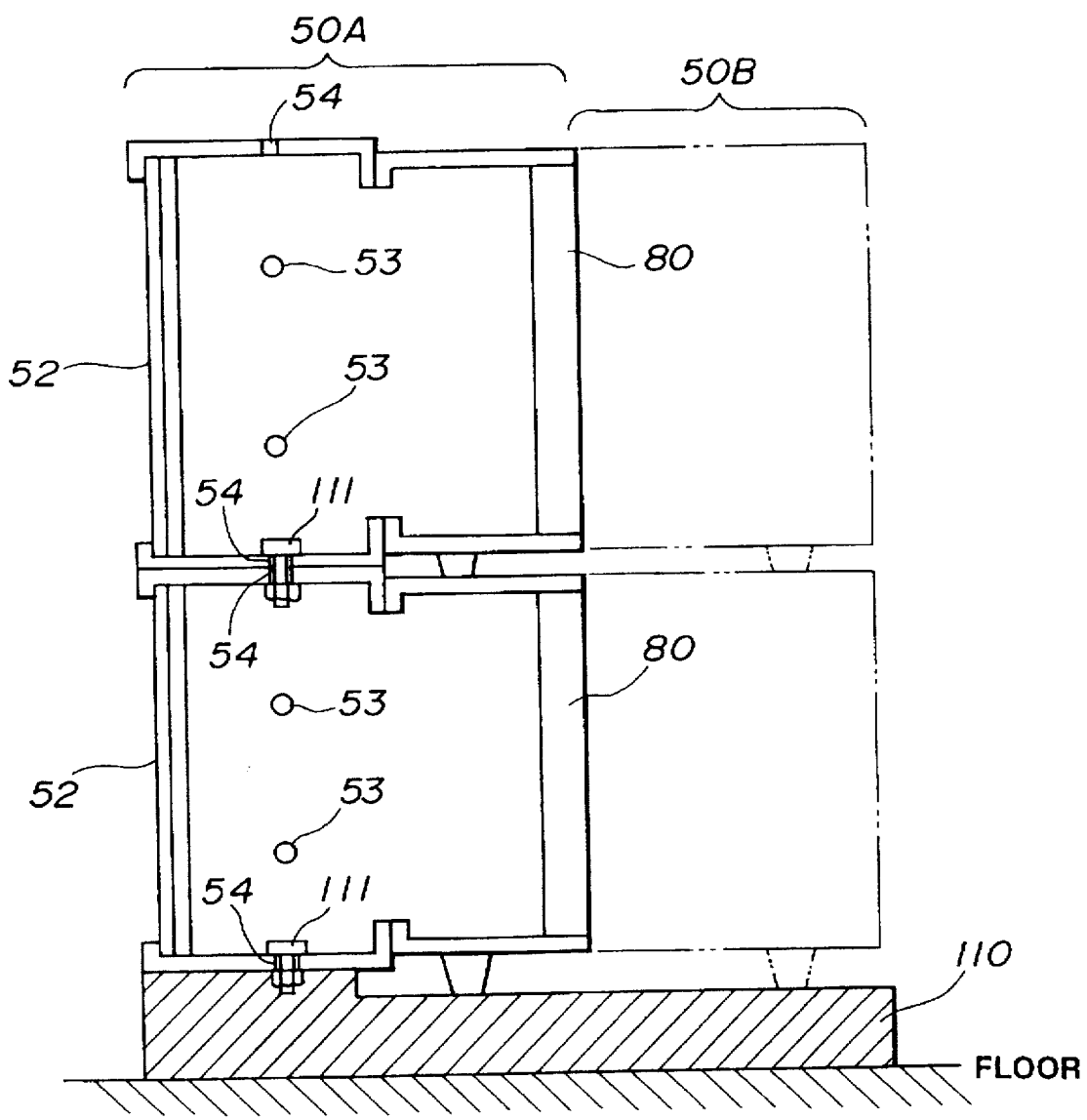
FIG. 13 is a vertically sectioned view showing the connection when the front half in FIG. 6 is divided and is heaped up in two steps to form a four-surface multiscreen display.

FIG. 13 is a vertically sectioned view showing a connected state when a four-face multiscreen display is formed by heaping in two steps the front halves of the unit displays shown in the embodiment in FIG. 6. FIG. 14 is an elevation of the same.

As shown in these drawings, the front half 50A of the unit display 50 on the lower step is connected and fixed to a base 110 on the floor by such locking means as bolts 111 through through holes 54 on the bottom surface. Then, the front half 50A of the unit display 50 on the upper step is mounted and the unit displays 50 are connected and fixed by passing the bolts 111 through the through holes 54 on the bottom surface of the front half 50A on the upper step and the through holes 54 on the upper half 50A on the lower step.

Figure 57:
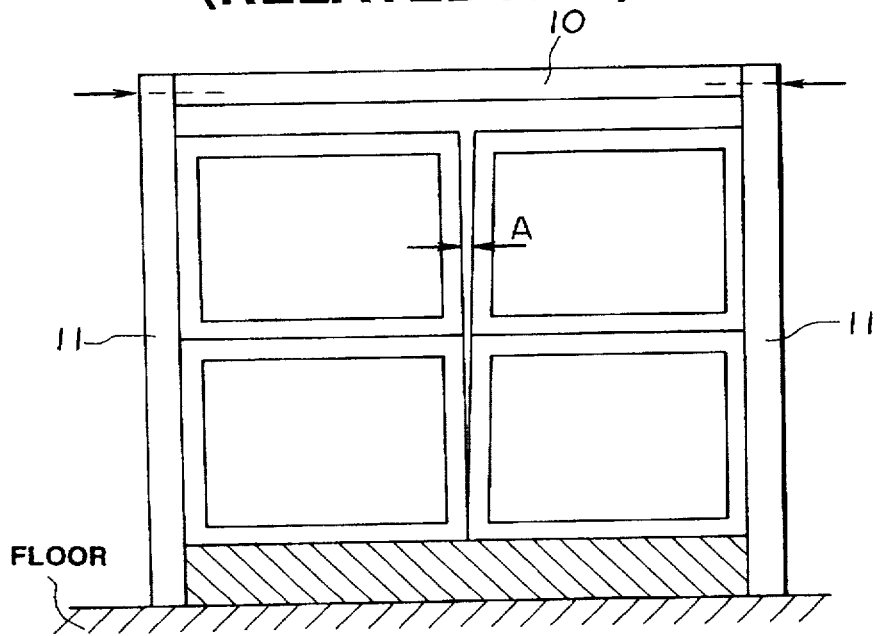
FIG. 57 is a view explaining the problem when unit displays are heaped up in steps.
Figure 58:
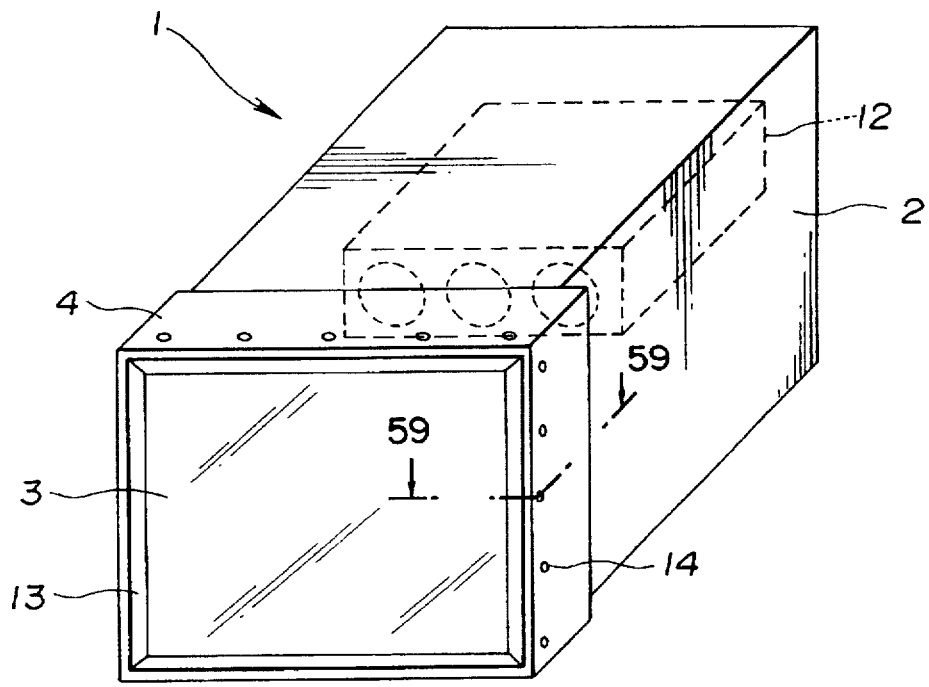
FIG. 58 is a perspective view showing another formation of a conventional unit display.
Figure 59:
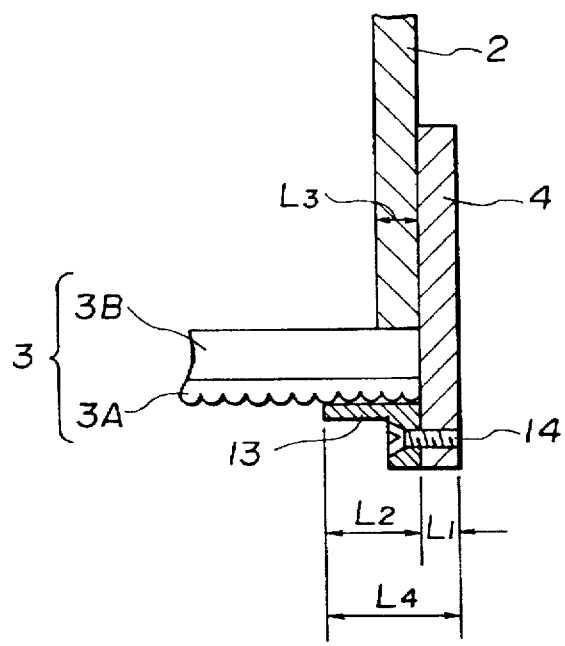
FIG. 59 is a partly sectioned view on line Z—Z in FIG. 58.

Further, as shown in FIG. 14, the front halves 50A of the unit displays 50 in the horizontal direction of the four-face multiscreen display are connected and fixed by passing the bolts 111 through the through holes 53 on the respective sides of the front halves 50A of the respective unit displays 50. Thus, all the four heaped unit displays and the base 110 are firmly connected and fixed into a four-face multiscreen display as if integrally, the gap A which has been a problem in the conventional example (FIG. 57) between the unit displays 50 can be eliminated and the angle or the like for rectifying the outer periphery becomes unnecessary.

As in the above, after the screen part for the multipicture is formed by heaping up only the front halves 50A of the unit displays 50, the rear halves 50B are connected and fixed to the front halves 50A of the respective unit displays 50 by means of the above described shafts or the like to complete the inherent unit displays 50.

According to the above described embodiments in FIGS. 1 to 14, when the unit display which is a component of a multiscreen display is divided into two parts of a first part containing screen parts and a second part containing optical system parts and chassis part, the weight and volume of each part will become half and the conveying operation, installing operation and the adjusting operation and servicing operation after the installation will become safe and easy. Particularly, according to the embodiments in FIGS. 6 to 14, in making a multiscreen (heaping in steps), first, the first part containing the screen parts is assembled, the respective first parts can be easily connected in the vertical direction and horizontal direction and the joints can be almost eliminated.

Also, according to the embodiments in FIGS. 1 to 12, when the second part is contained in the first part, in the conveyance and storage, the loading efficiency can be elevated and the space can be reduced. Particularly, according to the embodiments in FIGS. 6 to 12, in installing, as the second cabinet is set in a predetermined position with respect to the first cabinet, such guide means as pipes can be easily fitted and therefore, in the case of assembling the cabinets in a predetermined position and separating the second cabinet from the first cabinet, the operations will be easy and the number of parts will be reduced.

Figure 15:
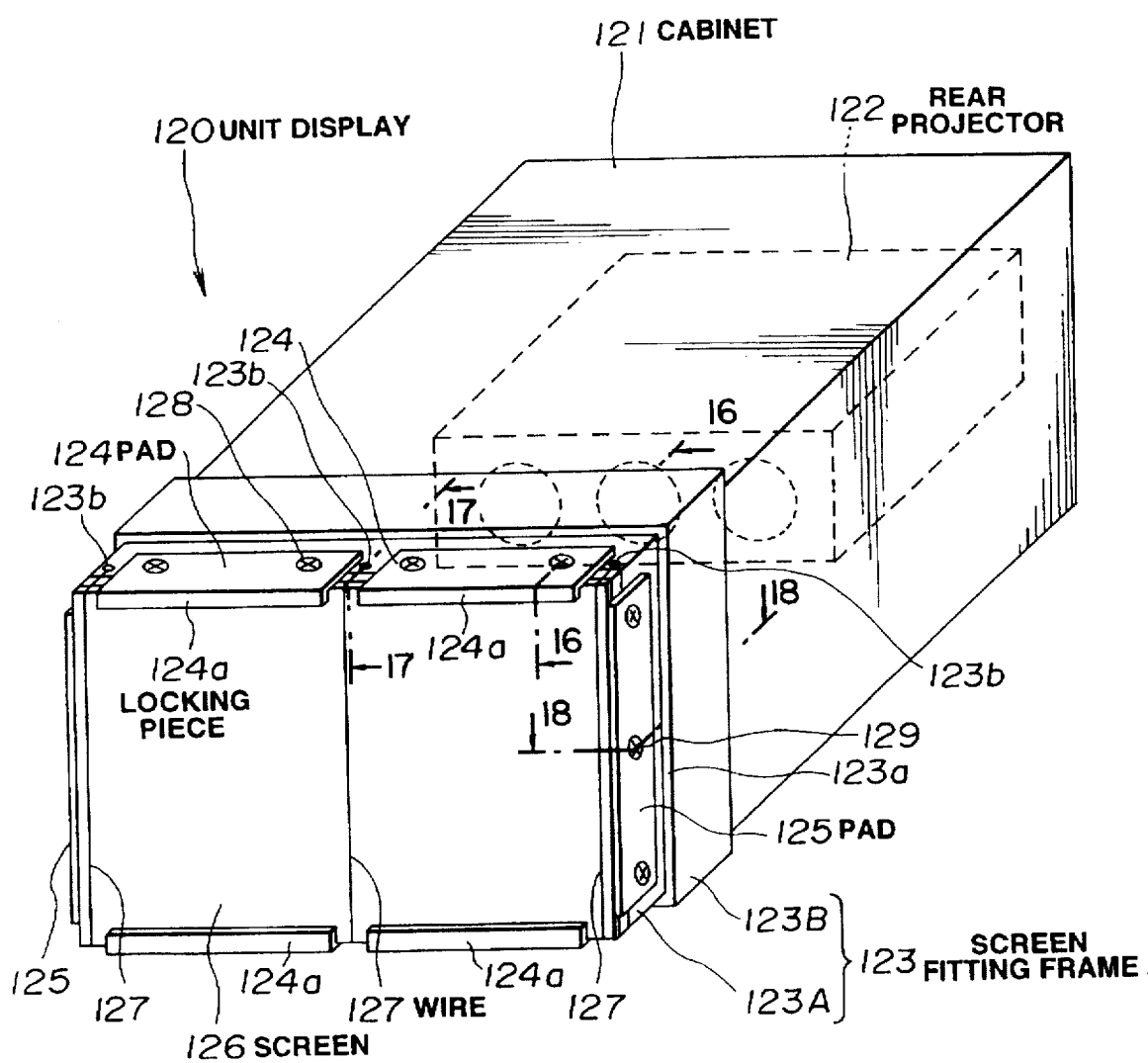
FIG. 15 is a perspective view showing a unit display in the fourth embodiment of a multiscreen display of the present invention.
Figure 16:
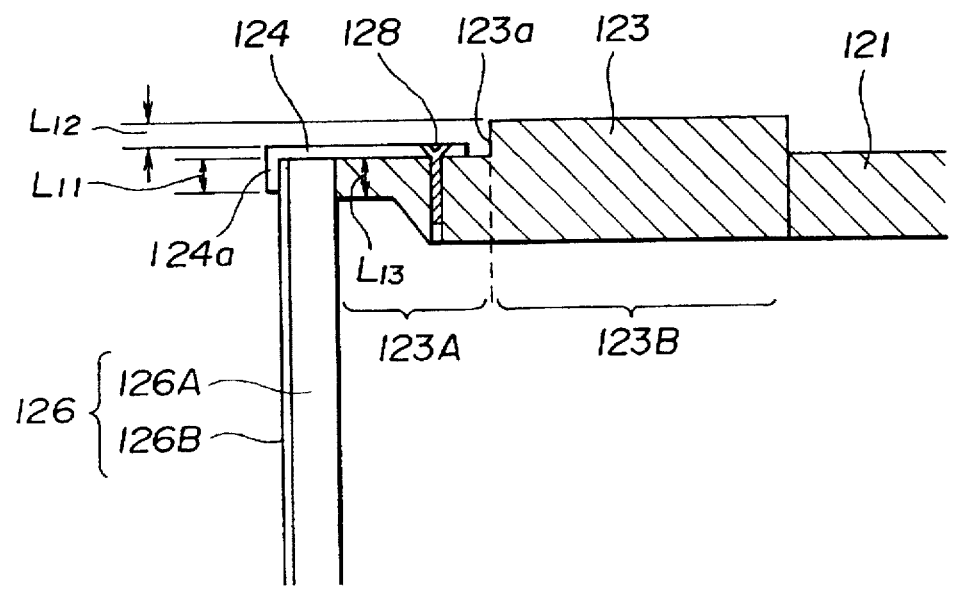
FIG. 16 is a sectioned view on line X—X in FIG. 15.
Figure 17:
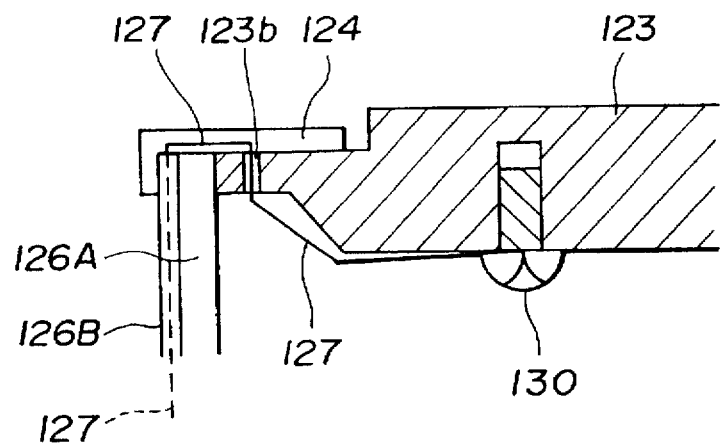
FIG. 17 is a sectioned view on line Y—Y in FIG. 15.
Figure 18:
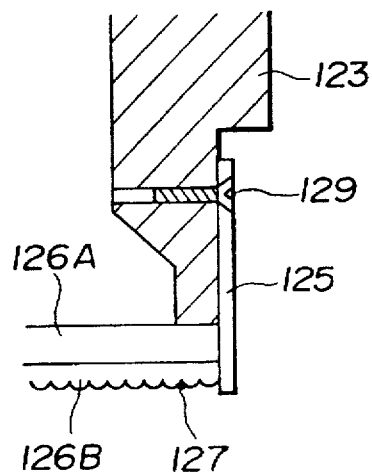
FIG. 18 is a sectioned view on line Z—Z in FIG. 15.

FIG. 15 is a perspective view showing a unit display in the fourth embodiment of a multiscreen display of the present invention. FIG. 16 is a sectioned view on line X—X in FIG. 15. FIG. 17 is a sectioned view on line Y—Y in FIG. 15. FIG. 18 is a sectioned view on line Z—Z in FIG. 15.

In FIG. 15, in a unit spray 120, a rear projector 122 is arranged is arranged within a cabinet 121, a screen fitting frame 123 is integrally provided on the front side of the cabinet 121, a screen 126 is fitted to this screen fitting frame 123, a plurality (three in the drawing) of wires 127 are stretched in the vertical direction on the surface of the screen 126, the screen 126 is pressed against the screen fitting frame 123 and the peripheral edge of the screen 126 is pressed with pads 124 and 125.

As shown in FIG. 16, the screen 126 is a Fresnel lens 126A on the back surface and a lenticular lens 126B on the front surface. Lights are once collected by the Fresnel lens 126 and are divided on the light and left by the lenticular lens 126B. The screen fitting frame 123 is formed of a screen side part 123A having a thin part and a thick rear side part 123B and is secured so as to be integral with the part of the cabinet 121.

In fitting the screen 126, as shown in FIG. 17, a plurality (in the drawing, respectively three on the upper surface and lower surface of the screen fitting frame 123) of through holes 123b are provided near the screen in the screen fitting frame 123, the end part of a wire 127 is passed through the upper and lower holes 123b, the wire 127 is pulled with a fixing screw 130 in the thick part on the rear side of the screen fitting frame 123 and the screen 126 is pressed in between the wire and the front end part (receiving part) of the screen fitting frame 123.

The wire 127 is thinner than the vertical groove width of the lenticular lens 126B and is stretched in the vertical groove of the lenticular lens 126 as shown in FIG. 18 and therefore the screen 126 will be prevented from lagging in the horizontal direction.

The peripheral edge of the screen 126 is pressed in with pads 124 and 125. Two sets of the pads 124 are arranged so as to be positioned among three wires 127. The pad 124 is provided with a locking piece 124 for locking the upper and lower ends of the front surface of the screen 126 and is screwed and fixed to the screen fixing frame 123 with screws 128 as shown in FIG. 16. The pad 125 is screwed and fixed to the screen fitting frame 123 with screws 129 as shown in FIG. 18 so as to press the right and left ends of the periphery of the screen 126. The pad 125 has no locking piece and a set of them is arranged on the right and left of the screen fitting frame.

Though the right and left pads 125 have no locking piece, as shown in FIG. 18, the wires 127 are arranged on the front surface of the screen fitting frame 123 and the screen 126 is pressed by the screen fitting frame 123 and wires 127 in a sandwich form. Therefore, a force sufficient to suppress the screen 126 deflecting direction will be developed and there will be no problem. As the locking part is thus unnecessary for the pad 125, the joint of the multiscreen formed by arranging unit displays will be extremely small and the thickness of the pad 125 only will do.

Figure 19:
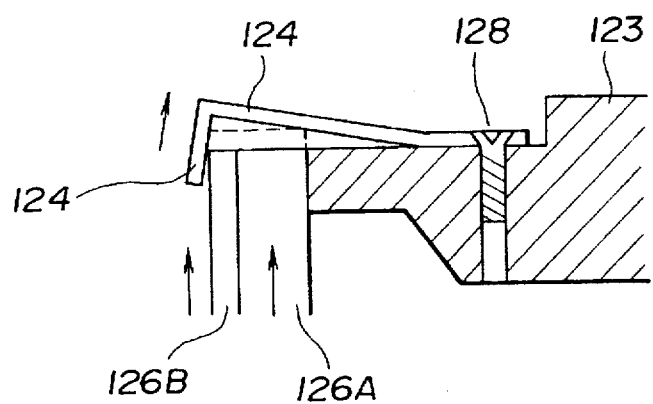
FIG. 19 is a sectioned view showing the effect of a pad in the embodiment in FIG. 15.

When the pad 124 is of a selected material and thickness having a spring effect and is fixed to the screen fitting frame 123 with the screws 128, a spring effect will be produced in the tip part supporting the screen end and therefore, as shown in FIG. 19, even if the screen 126 thermally expands (as shown by the dotted line), only the pad 124 will be transformed, no stress will be generated within the screen and the screen 126 will be able to be maintained. That is to say, even if a strain is generated by heat in the screen 126 and the screen 126 is transformed to be diamond-shaped, a stress escaping from the screen fitting frame 123 will act strongly. This is the same also on the pad 125.

Particularly, on the pad 124, during the conveyance by a truck or the like, even if the interior becomes high in the temperature, no stress will be given to the screen 126. Even against the expansion and lag of the screen 125, such pressing space L11 of the locking part 124a as is shown in FIG. 16 will be always maintained and therefore, even if an impact load is applied from outside during the conveyance, the screen end will be able to be positively held.

The above mentioned wire 127 has effects of preventing the upper and lower ends of the screen 126 from floating and preventing the central part of the screen 126 from being transformed. For example, during the conveyance or handling, even if a diamond-shaped transformation is instantaneously produced in the diagonal direction of the screen 126, as the swelling and depression of the screen 126 are prevented by the wires 127, the screen end will not easily protrude out of the pressing space L11 of the locking piece 124a of the pad 124.

Thus, as the screen 126 is pressed in against the receiving part of the screen fitting frame 123 by the plurality of wires 127 and the pads 124 and 125. The dimension L13 of the receiving part of the screen fitting frame 123 shown in FIG. 2 can be designed to be smaller than before.

Figure 20:
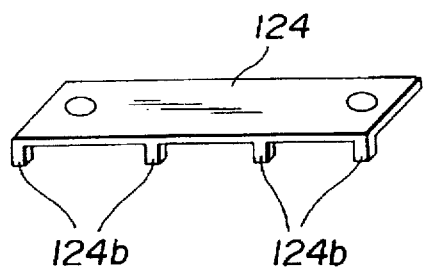
FIG. 20 is a perspective view showing another embodiment of a pad.

By the way, the pad 124 may not have such locking pieces 124a as in FIG. 15 but may have such locking pawls 124b as are shown in FIG. 20.

Figure 21:
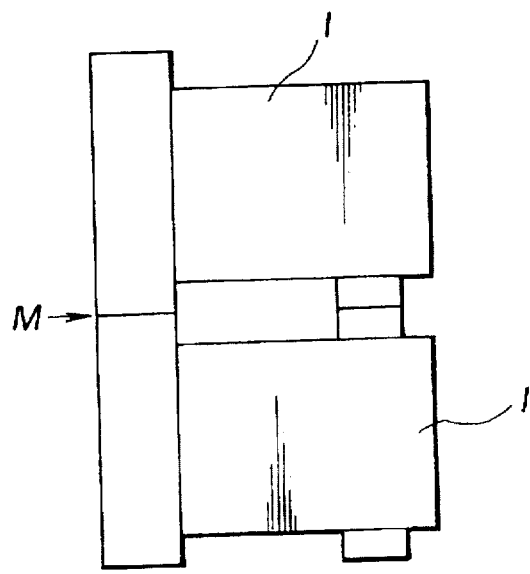
FIG. 21 is a side view showing a multiscreen display assembled so as to make the joint zero.

On the other hand, in the conventional example, in case the unit displays 1 are heaped up in multisteps as shown in FIG. 21, the joint will be so wide that such structure that the gap M between the heaped unit displays may be zero will be often made. In such case, during the exhibition or the like, when the temperature of the screen surface rises with the temperature rise within the unit display 1, the thermal expansion of only the screen part will become large, the screen will be rather transformed by the increase of the dimension and, as a result, the quality of the picture will reduce. That is to say, there will be no escape from the thermal expansion of the screen.

However, in the embodiment of the present invention, as shown in FIG. 16, a step difference 123a (of a dimension L12) is provided in the fixing part of the pad 124 and the thick part of the screen fitting frame and therefore, even if the screen dimension is expanded and the pad 124 is transformed by the thermal expansion as described above, as there is an escape, the screen surface will be able to be held without generating a warp.

Figure 22:
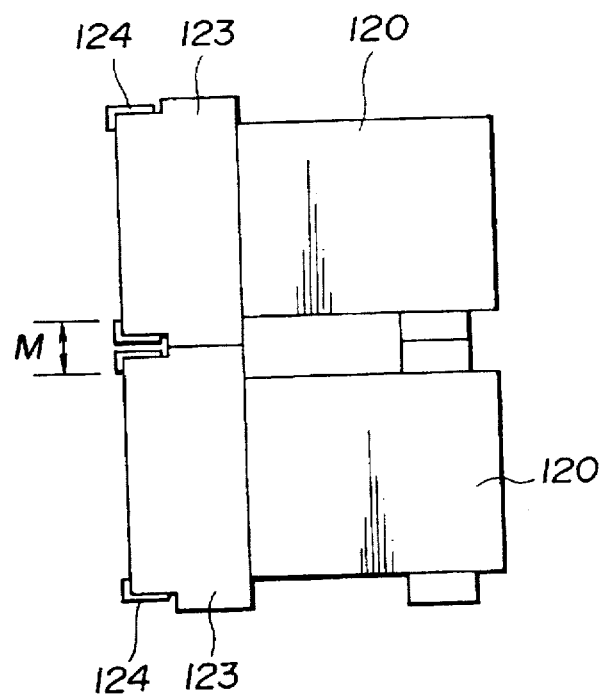
FIG. 22 is a side view showing a multiscreen display assembled by using the unit displays in FIG. 15.

As the joint in this embodiment is designed by such small dimensions as the dimension L11 of the locking piece 124a of the pad 124 in the vertical direction and only the thickness of the pad 125 in the horizontal direction, when the unit displays are heaped in multisteps, even if the step difference L12 is included in the joint between the unit displays, as compared with the conventional example, as shown in FIG. 22, the joint M will be able to be made far smaller.

According to the above described embodiment in FIG. 15, the joint between the unit displays can be controlled to be extremely minimum. The screen can be always positively held against the dimension variation by the thermal expansion coefficient difference between the screen itself and the frame and no strain is given to the screen itself.

By the way, as another embodiment relating to the embodiment in FIG. 15, in conveying the unit display 120, the screen 126 is pressed against the screen fitting frame 123 with a plurality of wires 127 and the peripheral edge of the screen is pressed with the pad 124 having the locking pieces 124a or locking pawls 124b (See FIG. 20) and, in installing it, after the respective unit displays 120 are set as heaped in a plurality of steps, the above mentioned wire 127 may be cut off and removed. Thereby, after the installation, even when a projected image is seen on the screen 126, the wires 127 will not be in the way at all. Even after the wire 127 is cut off, the screen 126 will be pressed against the screen fitting frame 123 by the locking pieces 124a or locking pawls 124b of the pad and therefore will not be disengaged.

Figure 23:
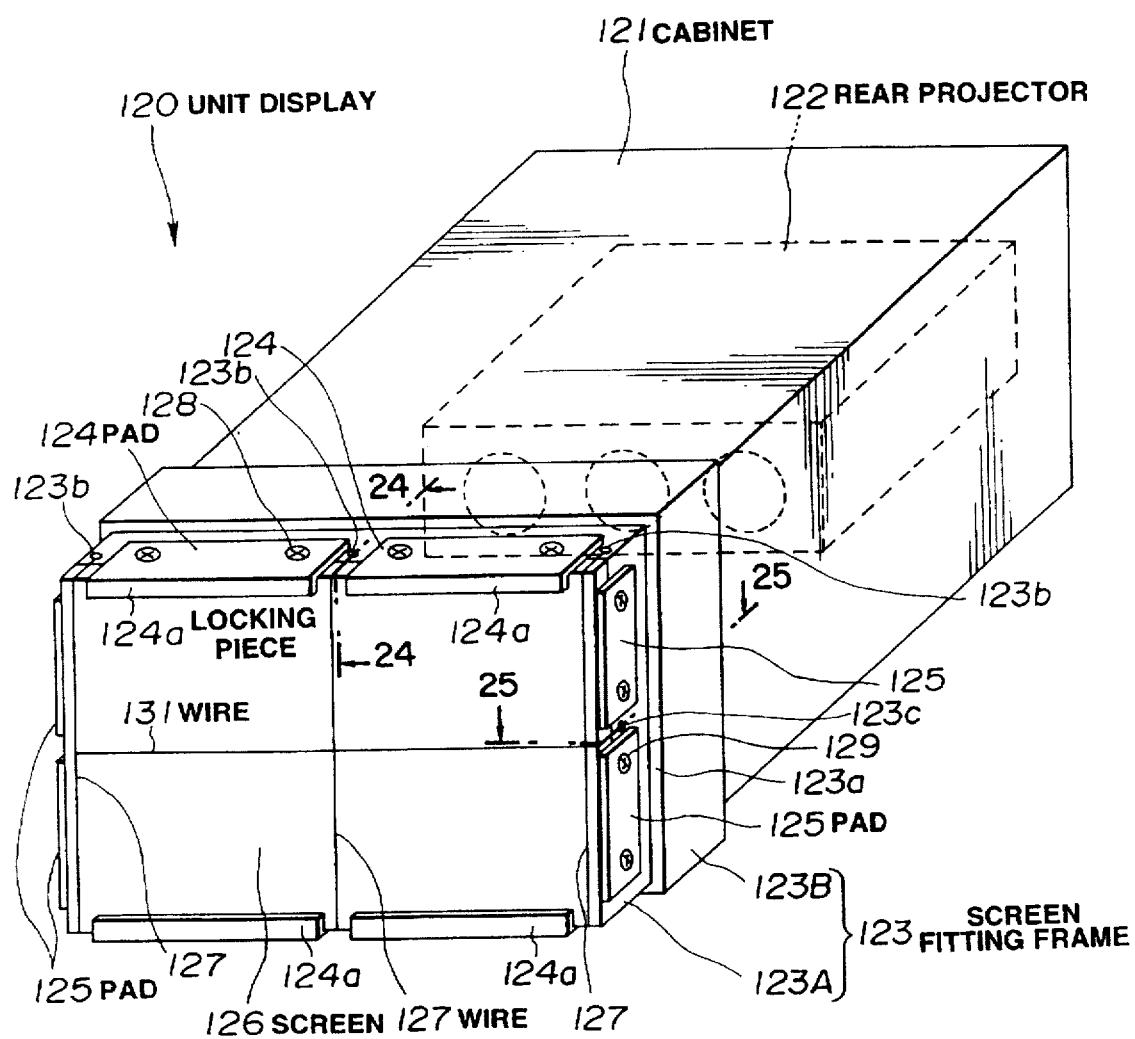
FIG. 23 is a perspective view showing the unit display in the fifth embodiment of a multiscreen display of the present invention.
Figure 24:
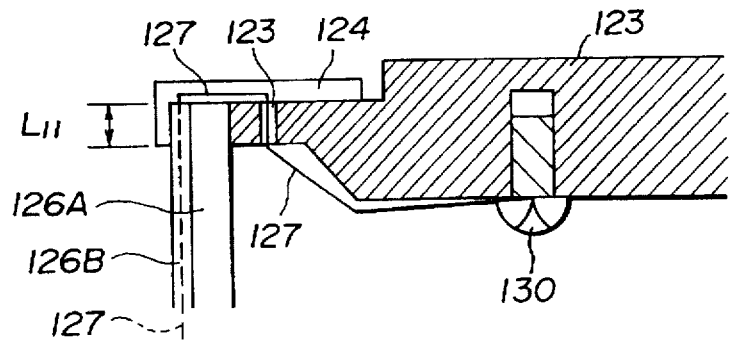
FIG. 24 is a sectioned view on line Y—Y in FIG. 23.
Figure 25:
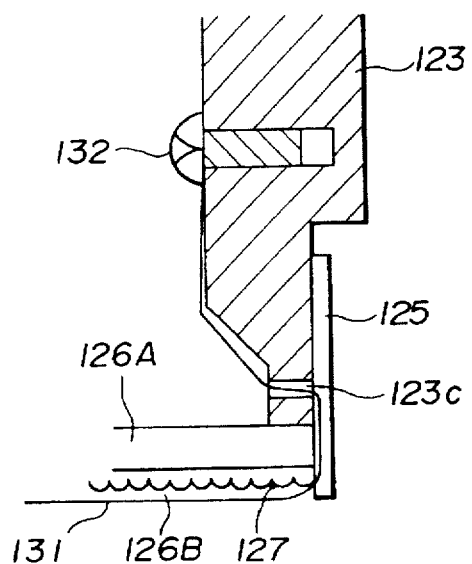
FIG. 25 is a sectioned view on line Z—Z in FIG. 23.

FIG. 23 is a perspective view showing a unit display in the fifth embodiment of a unit display of the present invention. FIG. 24 is a sectioned view on line Y—Y in FIG. 23. FIG. 25 is a sectioned view on line Z—Z in FIG. 23. The same elements as in FIG. 15 shall be explained by attaching the same reference numerals.

In the embodiment in FIG. 23, in addition to the wire 127 in the vertical direction on the screen 126 shown in the embodiment in FIG. 15, one wire 131 is added in the horizontal direction on the screen 126.

Concretely, the difference from the embodiment in FIG. 15 is that the pad 125 arranged on each of the right and left surfaces of the screen fitting frame 123 is divided into two pads, a pair of right and left through holes 123c are provided in the positions between these two pads 125 and a wire 131 is passed through these holes 123c and is stretched in the horizontal direction. The other formations are the same as in FIG. 15.

Therefore, in the vertical direction, the same as in the embodiment in FIG. 15, three wires 127 are stretched so as to be along the vertical groove of the lenticular lens 126B. The structures of stretching the wires 127 and 131 in the vertical and horizontal directions are similar to each other as shown in FIGS. 24 and 25. As shown in FIG. 24, the wire 127 in the vertical direction is the same as in the above described FIG. 17. As shown in FIG. 25, the wise 131 in the horizontal direction passes on the surface of the lenticular lens 126B of the screen 123, passes through the hole 123c provided in the screen fitting frame 123 and is locked to the fixing screw 132 on the inner surface of the screen fitting frame 123.

According to the above mentioned formation, in addition to the three wires 127 in the vertical direction, one wire 131 is added to the center in the horizontal direction, the swell of the screen 126 is pressed in by the wire tension in both vertical and horizontal directions and the screen holding force can be improved. Thereby, the dimension L11 of the locking piece 124 for preventing the floating of the upper and lower ends of the screen 126 can be made further smaller. That is to say, in order to stretch the wires 127 and 131 in a cruciform, a twofold effect will be developed to prevent the bending of the screen 126.

The wire 131 provided in the horizontal direction passes through the center of the screen 126, is made horizontal so as to be stretched in a cruciform with the wire 127 in the center of the screen in the vertical direction and is also a criterion of adjusting the linearity of convergence.

Figure 26:
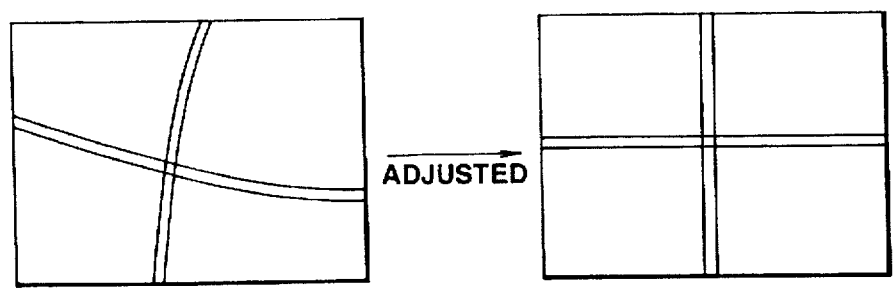
FIG. 26 is an explanatory view showing the linearity adjustment of the convergence in the embodiment in FIG. 23.

Such video image of a cruciform pattern or grid pattern as is shown in FIG. 26 is displayed on the screen 26 to adjust the linearity of convergence. At this time, the position of the cruciform pattern or grid pattern may be adjusted to coincide with the center of the cruciform wires.

According to the above described embodiment in FIG. 23, in case a multiscreen is made by heaping unit displays in steps, the joint between the unit displays will be able to be controlled to be very small. The criterion of adjusting the linearity of convergence can be made also by the cruciform wires.

By the way, as another embodiment relating to the embodiment in FIG. 23, in conveying the unit display 120, the screen 126 is pressed against the screen fitting frame 123 with a plurality of wires 127 and 131 and the peripheral end of the screen is pressed with the pad 124 having the locking pieces 124a or locking pawls 124b (See FIG. 20). In fitting, respective unit displays 120 are set as heaped in a plurality of steps or further the convergence is adjusted and then the above mentioned wires 127 and 131 may be cut off and removed. Thereby, after the installation, when the projected picture on the screen 126 is seen, the wires 127 and 131 will not be in the way at all. Further, even after the wires 127 and 131 are cut off, the screen 126 will be pressed against the screen fitting frame 123 by the locking pieces 124a or locking pawl 124b and will not be disengaged.

Figure 27:
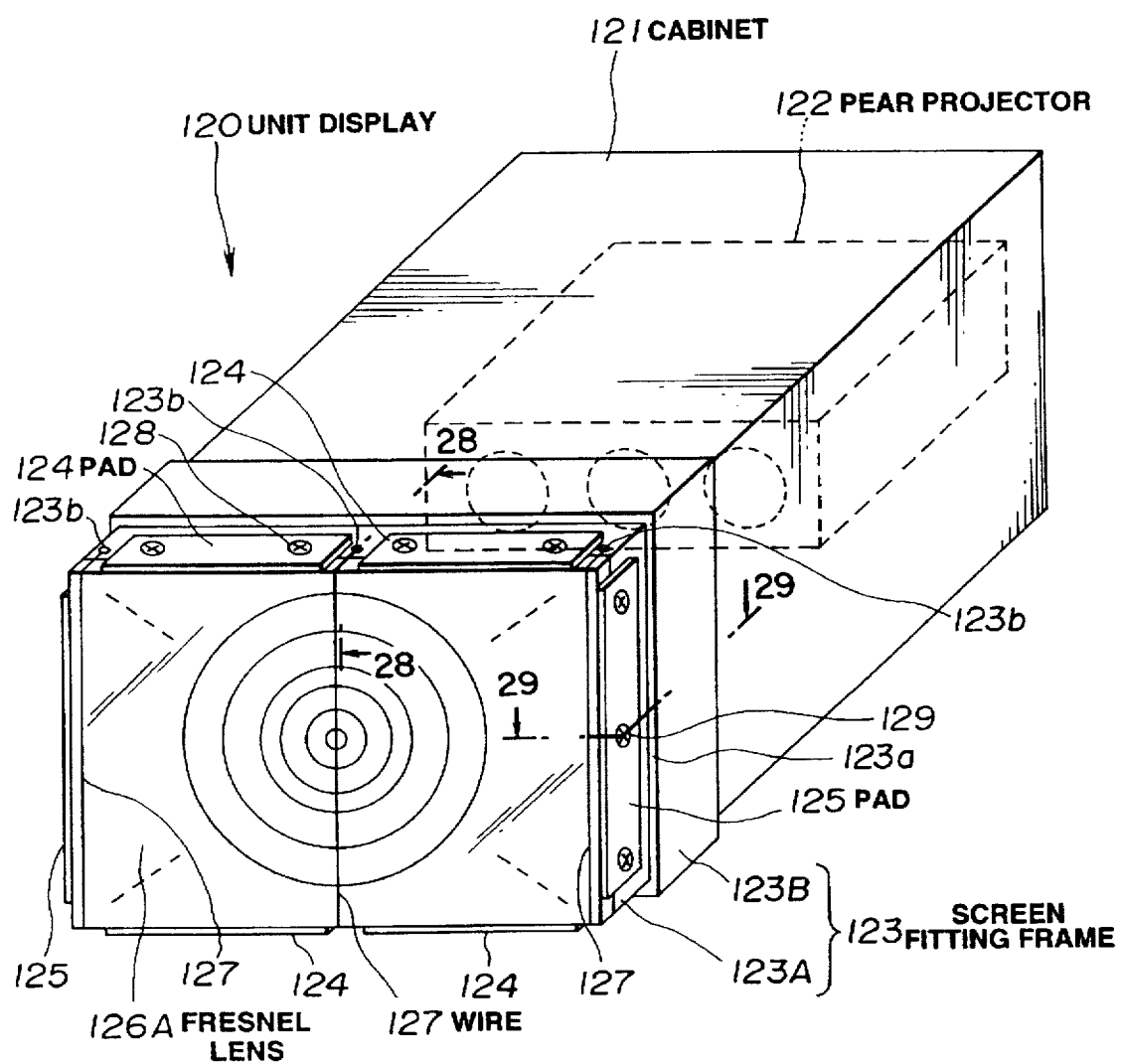
FIG. 27 is a perspective view showing the unit display in the sixth embodiment of a multiscreen display of the present invention.
Figure 28:
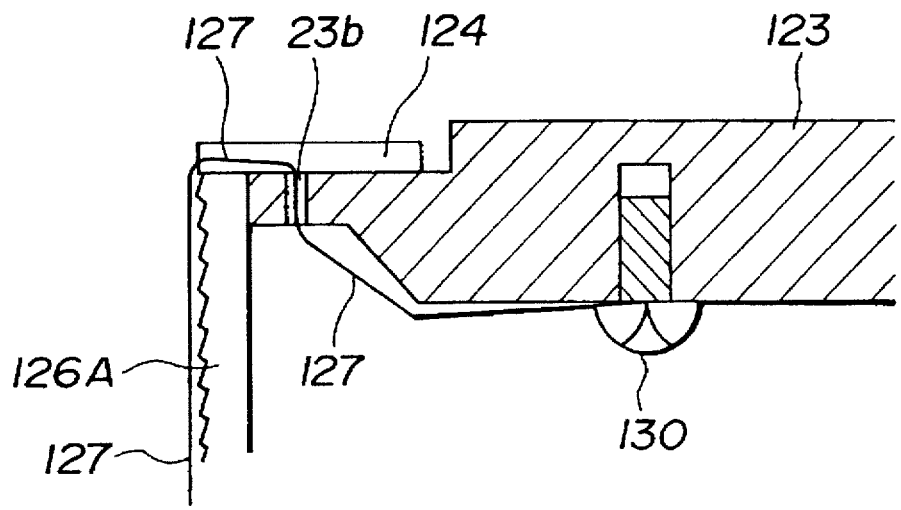
FIG. 28 is a sectioned view on line Y—Y in FIG. 27.
Figure 29:
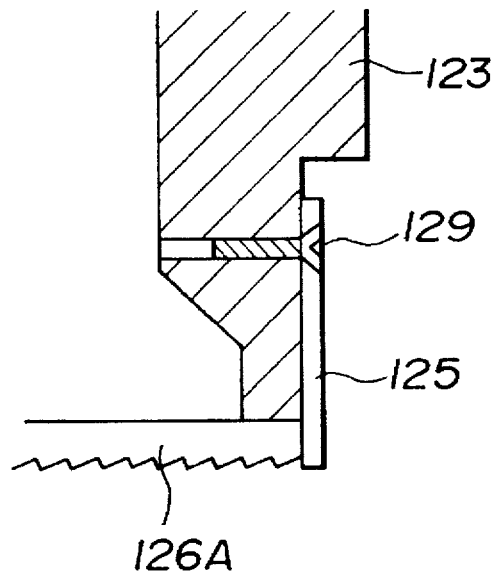
FIG. 29 is a sectioned view on line Z—Z in FIG. 27.
Figure 30:
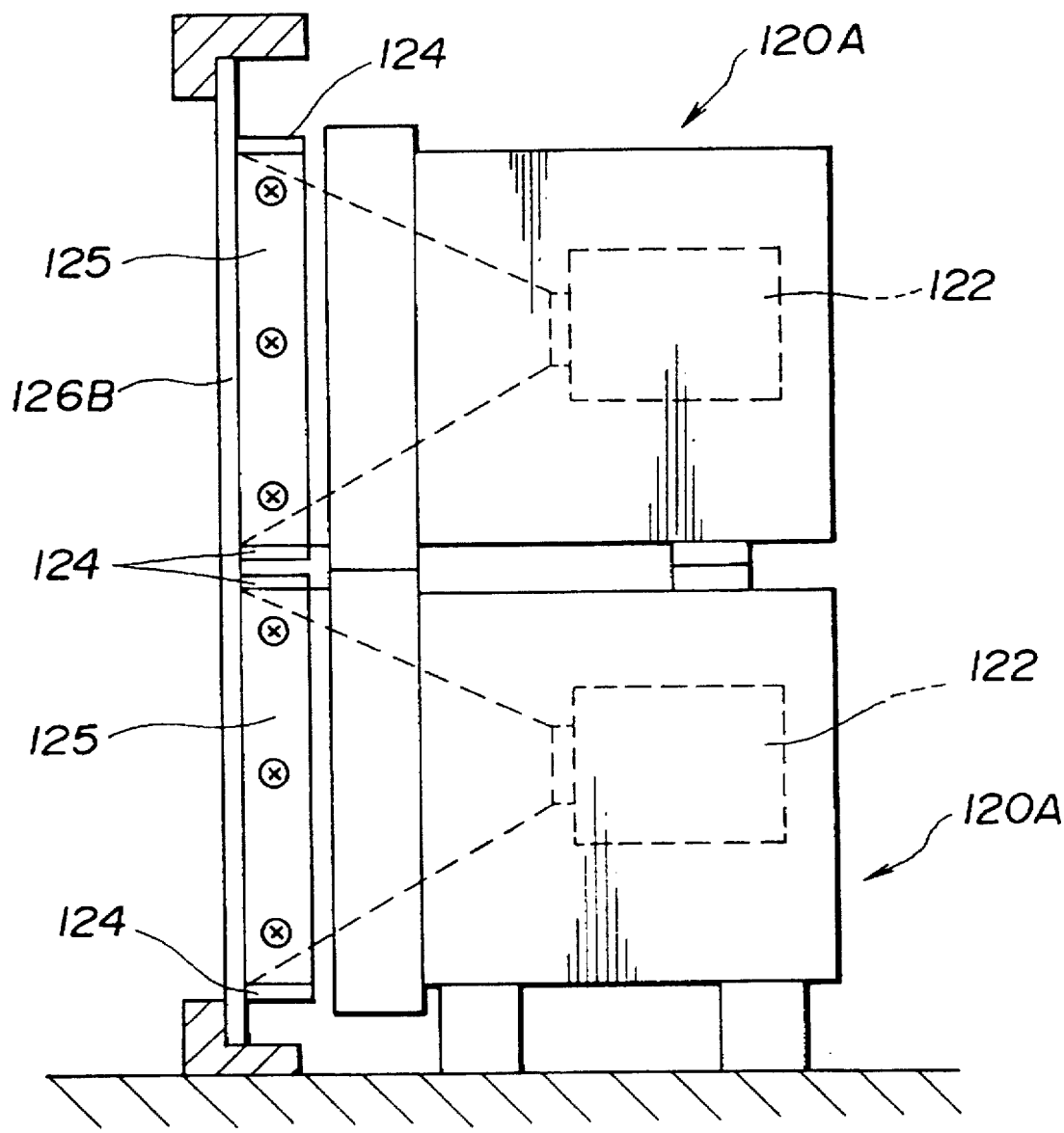
FIG. 30 is a side view showing a multiscreen display assembled by using a lenticular lens made integral with the unit display in FIG. 27.

FIG. 27 is a perspective view showing the unit display in the sixth embodiment of a unit display of the present invention. FIG. 28 is a sectioned view on line Y—Y in FIG. 27. FIG. 29 is a sectioned view on line Z—Z in FIG. 27. FIG. 30 is a side view of a multiscreen as made by heaping in steps the unit displays in FIG. 27. The same elements as in FIG. 15 shall be explained by attaching the same reference numerals.

The difference of the embodiment in FIG. 27 from the embodiment in FIG. 15 is that only the Fresnel lens 126A of the screen (formed of the two lenses of a lenticular lens and Fresnel lens) is fixed to the screen fitting frame 123 with a plurality (three in the drawing) of wires 127 thinner than the vertical groove width of the lenticular lens and the pads 124 and 125 pressing the outer peripheral end surface of the Fresnel lens 126A. As shown in FIG. 14, the wire 127 passes on the surface of the Fresnel lens 126A having a spiral groove, passes through a through hole 123c provided in the screw fitting frame 123 and is locked to a fixing screw 130 on the inner surface of the screen fitting frame 123. The pad 124 used here is different from that in the embodiment in FIG. 15 and has no locking piece 124 for locking the upper and lower ends of the screen. Therefore, the pads 124 and 125 have no locking part covering the screen surface and, when the unit displays 120A are heaped up in steps, the joint will be able to be further reduced.

In making a multiscreen by heaping a plurality of unit displays 120A having the Fresnel lenses 126A (shown in FIG. 27) incorporated, the lenticular lens 126B made one is arranged adjacently to the Fresnel lens 126A on the front surface of the plurality (four in the drawing) of the heaped unit displays 120A as shown in FIG. 30 so that a screen formed of the two lenses of the inherent lenticular lens and Fresnel lens may be made.

The pads 124 and 125 have also the same function as of the shielding plate of the conventional example. The plurality of fixing wires 127 are thinner than vertical groove width of the lenticular lens 126B and therefore will be mixed into the vertical groove of the lenticular lens 126B and will not be substantially conspicuous at an optimum sighting distance particularly when the picture is made large by the multiscreen or the like.

Further, when no image is projected by the projector 122, these wires 127 and the pads 124 and 125 will hide behind the lenticular lens 126B made one and will be seen only as one screen.

By the way, when the wire fixing the Fresnel lens 126 are stretched in the horizontal direction and so as to pass through the center of the Fresnel lens 126A, a cruciform will be formed in the above described vertical direction and with the wire 127 passing through the center of the Fresnel lens and will be able to be used as a criterion for adjusting the linearity of convergence.

Figure 60:
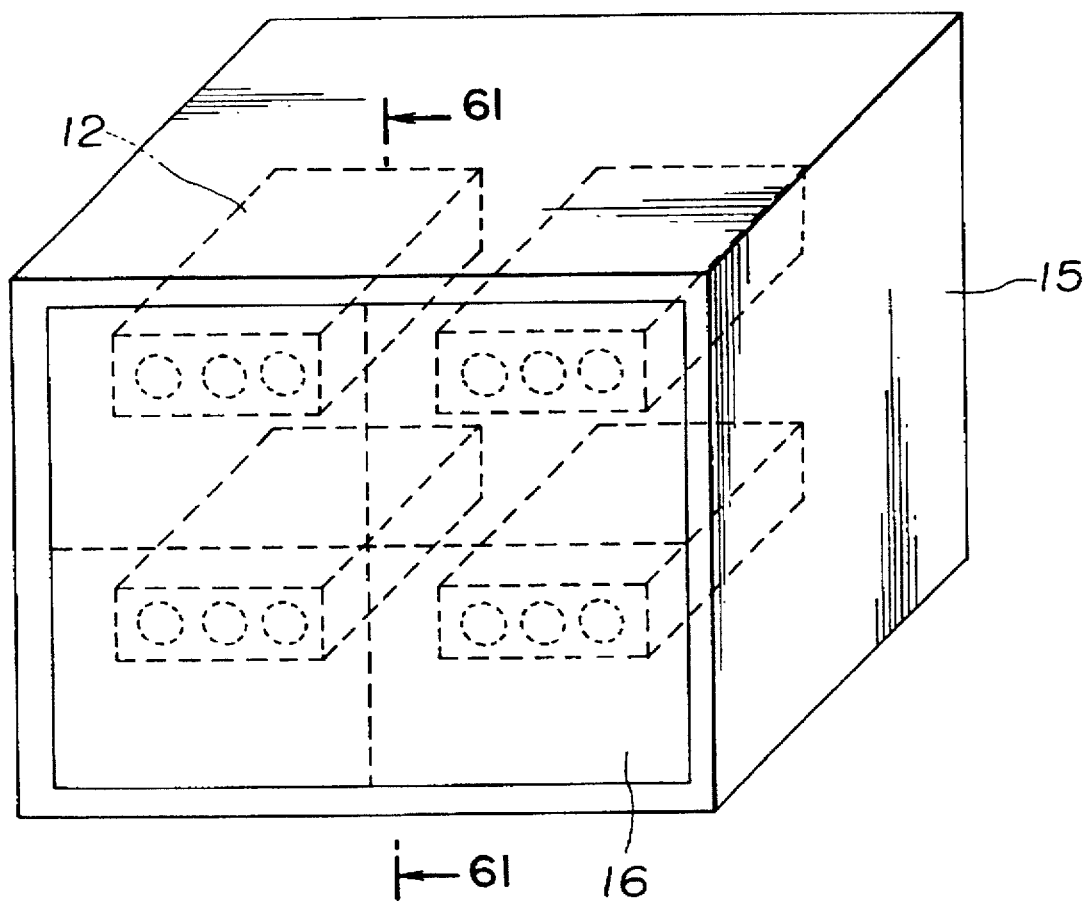
FIG. 60 is a perspective view of a multiscreen display of another conventional example.
Figure 61:
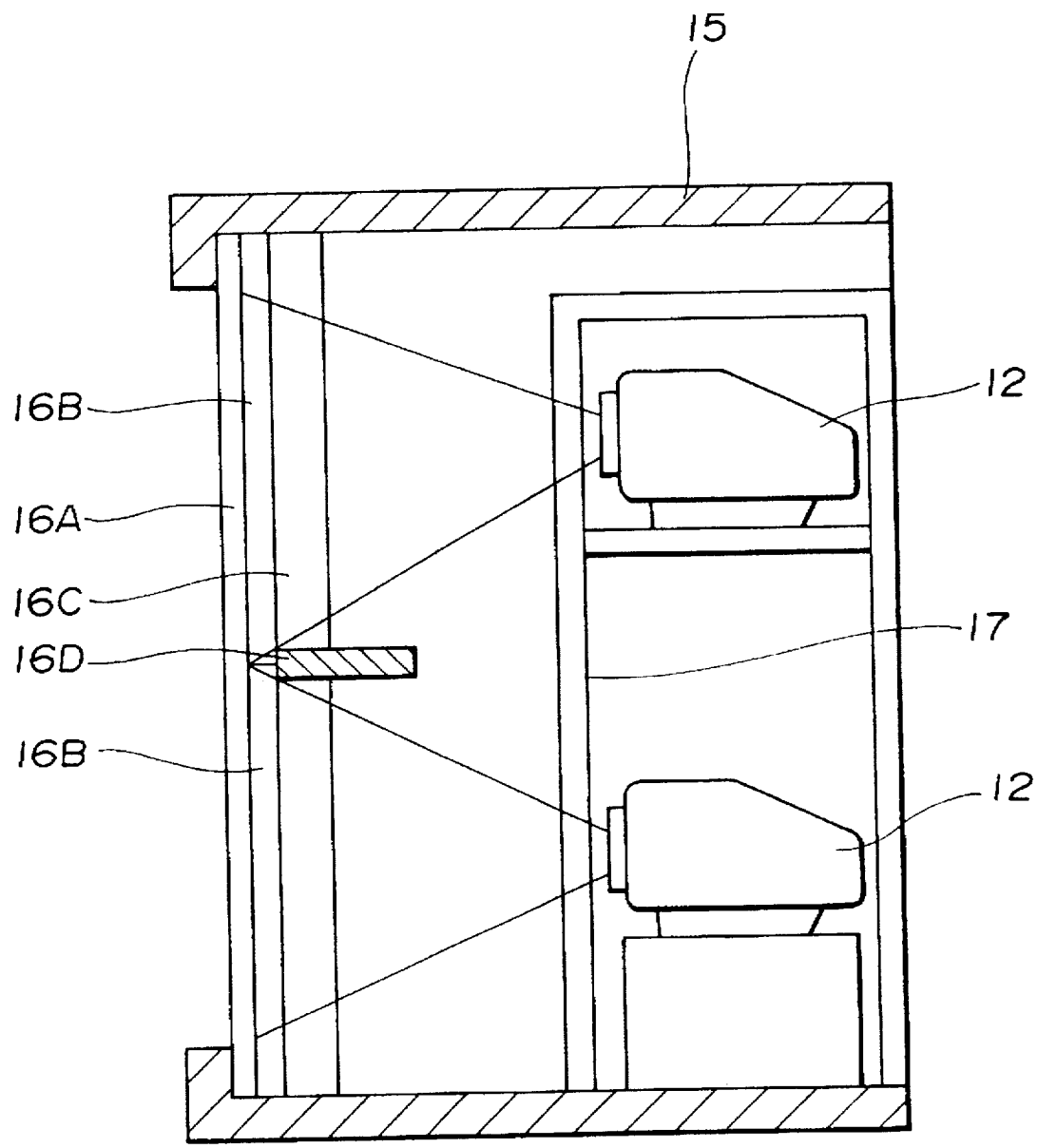
FIG. 61 is a sectioned view on line Y—Y in FIG. 60.

According to the above described embodiment in FIG. 27, when a multiscreen is made by heaping in multisteps the unit displays 120A having only the Fresnel lenses 126A arranged on the front surfaces, the joint between the respective unit displays 120A will be able to be completely hidden. That is to say, as compared with the conventional examples in FIGS. 60 and 61, in this embodiment, a multiscreen can be made as combined with the lenticular lens 126B made one while securing a structure easy to handle and install the unit displays 120A.

According to the above described embodiments in FIGS. 15 to 30, the dimensions of the parts for fixing the screen can be kept minimum, further the screen holding force can be improved, the joint when the unit displays are heaped in steps can be minimized, the information amount of the picture can be made large, the ugliness can be reduced, the operability for adjusting the linearity of convergence can be improved and a multiscreen display high in the assemblability in setting can be provided.

Figure 31:
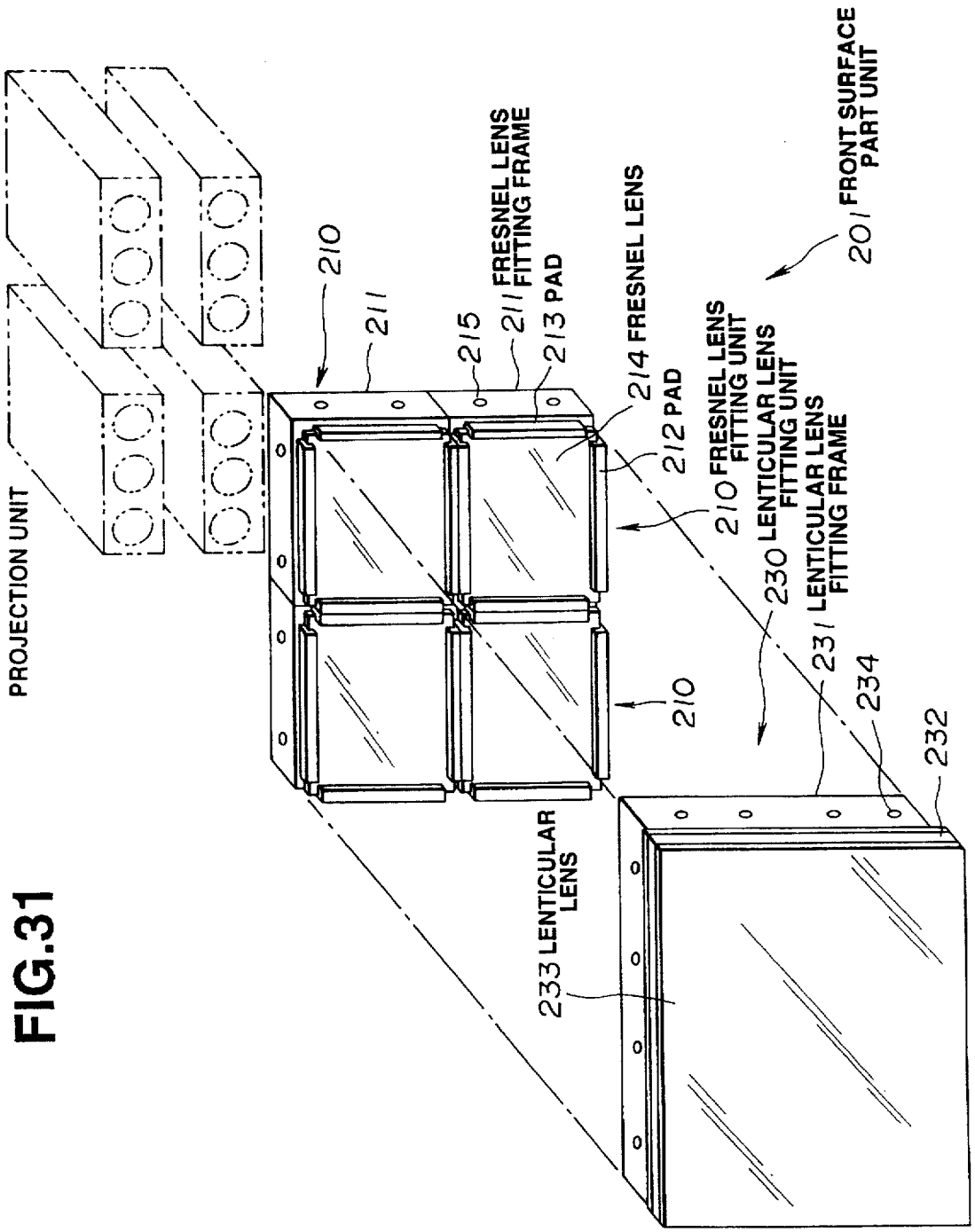
FIG. 31 shows a front surface part unit of the seventh embodiment of a multiscreen display of the present invention and is a disassembled perspective view of a Fresnel lens fitting unit and lenticular lens fitting unit.

FIG. 31 is a disassembled perspective view of a Fresnel lens fitting unit and lenticular lens fitting unit, showing the front surface part unit of the seventh embodiment of a multiscreen display of the present invention.

In FIG. 31, the reference numeral 201 represents a front surface part unit of a multiscreen display of a multiscreen system. In this front surface part unit 201, four Fresnel lens fitting units 210 are assembled as arranged in two vertical rows and two horizontal rows and a lenticular lens fitting unit 230 is fitted on the front surface sides of the assembled Fresnel lens fitting units 210.

The Fresnel lens fitting unit 210 is fitted with the Fresnel lens 214 on the front surface side of the Fresnel lens fitting frame 211 by the upper and lower pads 212 and right and left pads 213. Four projecting units are arranged on the back surface sides of four Fresnel lens fitting frames 211 so that the lights from the four projecting units may be respectively projected from the back surface side. Two bolt fixing through holes 215 are formed on each of the upper, lower, right-and left side surfaces of the Fresnel lens fitting frame 211.

The lenticular lens fitting unit 230 is fitted with the lenticular lens 233 through a reinforcing piece 232 formed to be frame-shaped of such material having a high strength and some degree of resiliency as hard plastics on the front surface side of the lenticular lens fitting frame 231. Four bolt fixing through holes 234 are formed in the positions corresponding to the through holes 215 of the above mentioned Fresnel lens fitting frame 211 on each of the upper, lower, right and left side surfaces of the lenticular lens fitting frame 231. This front surface part unit 201 forms one multiscreen of such Fresnel lens fitting units 210 and lenticular lens fitting unit 230.

Figure 32:
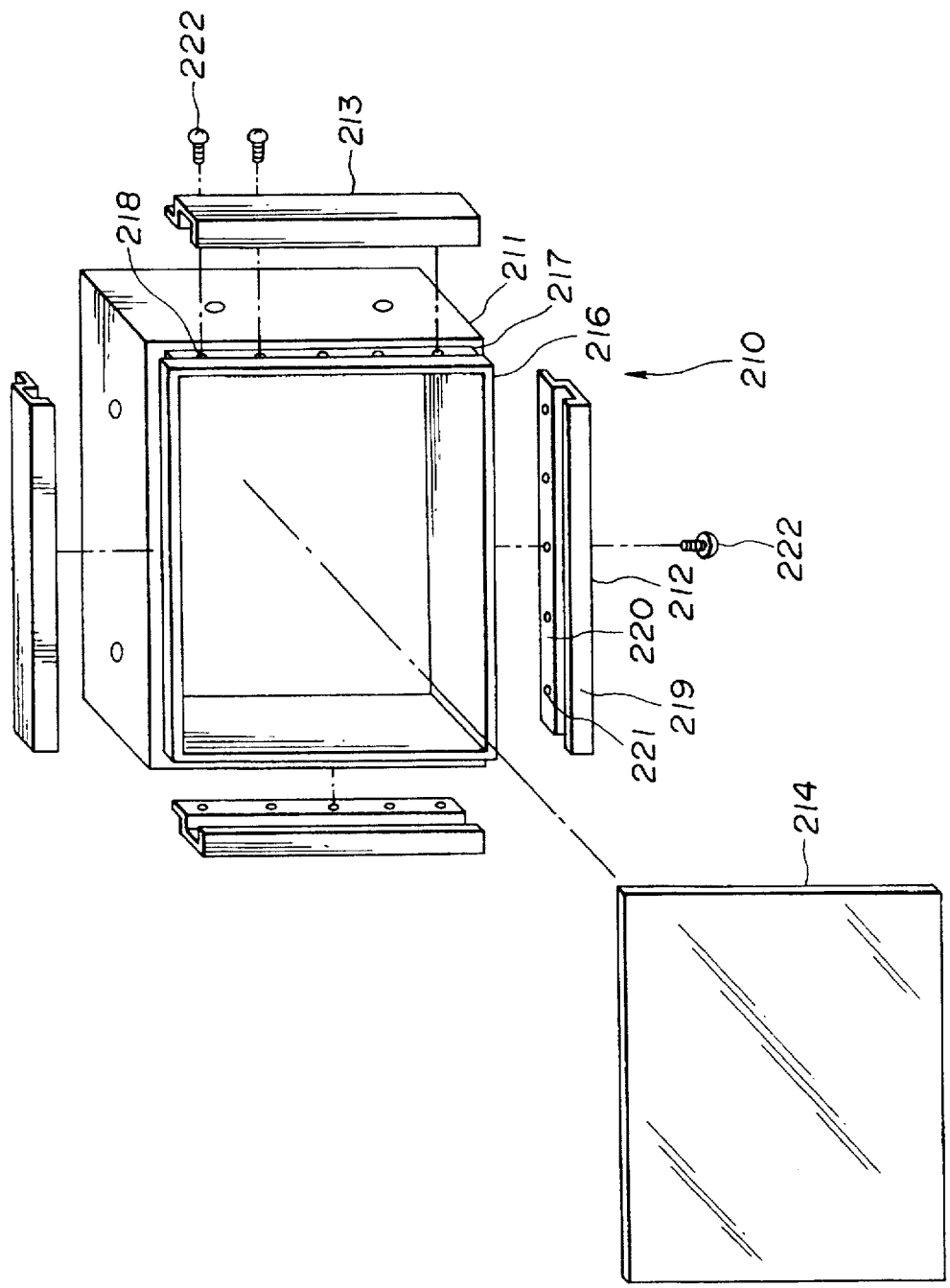
FIG. 32 is a disassembled perspective view showing the Fresnel lens fitting unit in FIG. 31.

FIG. 32 is a disassembled perspective view showing the Fresnel lens fitting unit 210 in FIG. 31.

The Fresnel lens fitting frame 211 of the Fresnel lens fitting unit 210 is formed to be frame-shaped of such high strength material as an aluminum alloy and has a Fresnel lens fitting part 216 formed on the front surface side. The Fresnel lens fitting frame is formed to be smaller in the diameter by the thickness of the pads 212 and 213 than the outer periphery of the Fresnel lens fitting frame 211. A groove part 217 is formed on the back surface side of the Fresnel lens fitting part 216 and has five screw holes 218 formed at regular intervals on each surface.

The pad 212 has a locking piece 219 for locking the Fresnel lens plate 214 formed on the front surface side by bending a metal plate to be channel-shaped and has a screw fixing part 220 formed by bending the back surface side to be L-shaped toward the back surface. This screw fixing part 220 has through holes 221 formed in the positions corresponding to the screw holes 218 of the above mentioned groove part 217. The screw fixing part 220 will be fitted and fixed to the above mentioned groove part 217 when screws 222 are inserted into the through holes and are screwed into the screw holes 218. The pad 213 is of the same structure as of the pad 212 except that only the length is different.

Figure 33:
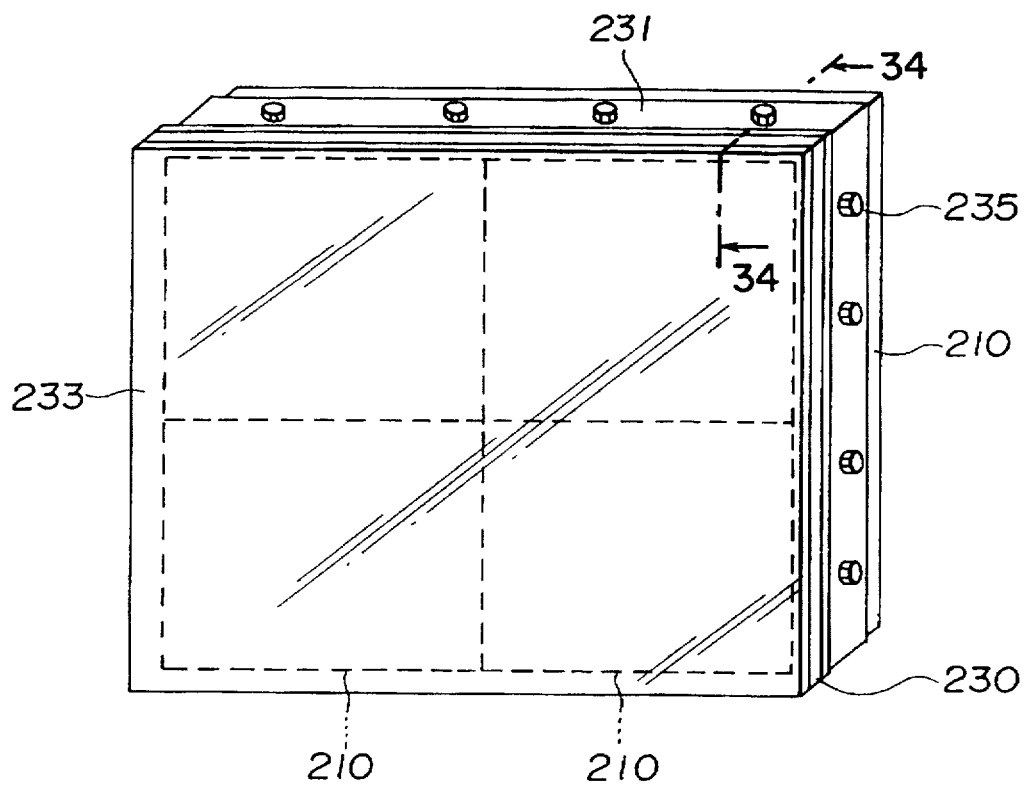
FIG. 33 is a perspective view showing the front surface part in FIG. 31.

FIG. 33 is a perspective view showing the front surface part in FIG. 31.

In FIG. 33, when the Fresnel lens fitting units 210 assembled in two vertical rows and two horizontal rows are inserted from the back surface side, the lenticular lens fitting unit 230 will be fitted to the Fresnel lens fitting units 210 assembled with bolts 235 so that the Fresnel lens 214 may be arranged on the back surface side of the lenticular lens 233.

Figure 34:
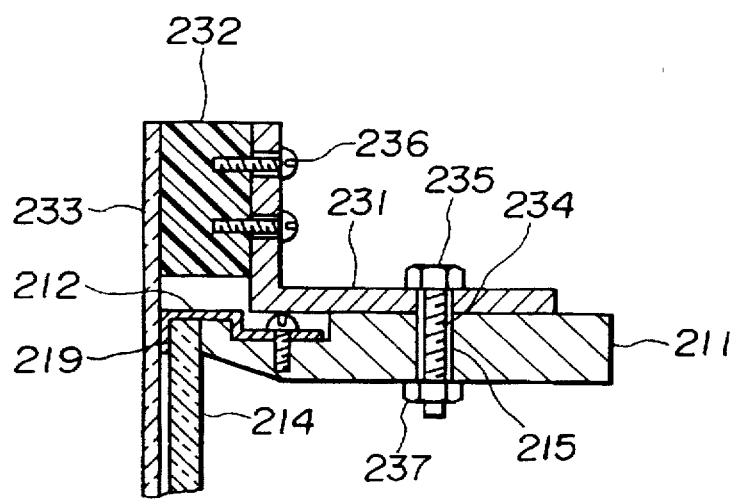
FIG. 34 is a sectioned view on line A—A in FIG. 33.

FIG. 34 is a sectioned view on line A—A in FIG. 33. As shown in this drawing, the lenticular lens fitting frame 231 of the lenticular lens fitting unit 230 is formed to be L-shaped with the front surface side directed outside and a reinforcing piece 232 is screwed and fixed by screws 236 in this part. The lenticular lens 233 is fitted by bonding on the front surface side of the reinforcing piece 232. The bolt 235 is inserted through the through hole 234 of the lenticular lens fitting frame 231 and through the through hole 215 of the Fresnel lens fitting frame 211 and is screwed into a nut 237 to fix the lenticular lens fitting frame 231 and Fresnel lens fitting frame 211. In this state, the locking piece 219 of the pad 212 locking the Fresnel lens 214 will be in contact with the back surface side of the lenticular lens 233.

Figure 35:
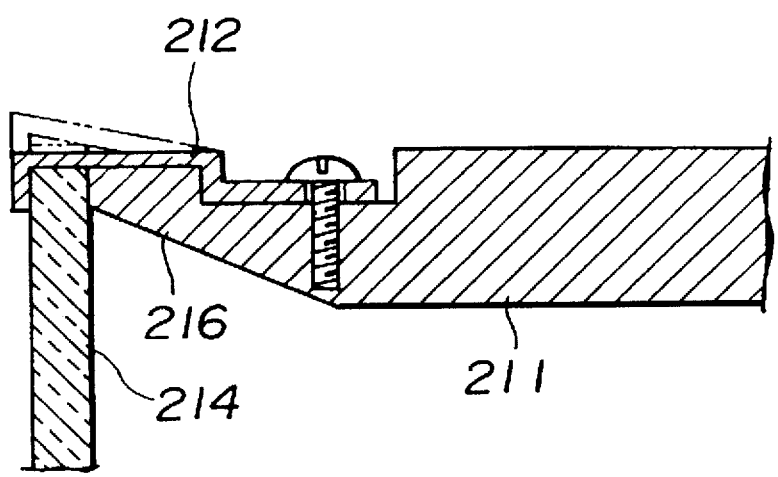
FIG. 35 is a sectioned view showing as magnified a pad and its peripheral part in FIG. 34.

FIG. 35 is a sectioned view showing the pad and its peripheral part in FIG. 34 as magnified.

The pad 212 has a resiliency. In case the Fresnel lens 214 expands to the state of the broken line from the state of the solid line due to the temperature rise, the pad 212 will bend outside to apply an inside directed force to the Fresnel lens 214. Here, the outer periphery of the Fresnel lens fitting part 216 and the outer periphery of the Fresnel lens 214 are set so as to coincide with each other at about −20 degrees below the freezing point which is a lower limit of the general atmospheric temperature. Therefore, at the normal temperature, the pad 212 will always apply an inside directed force to the Fresnel lens 214.

Figure 36:
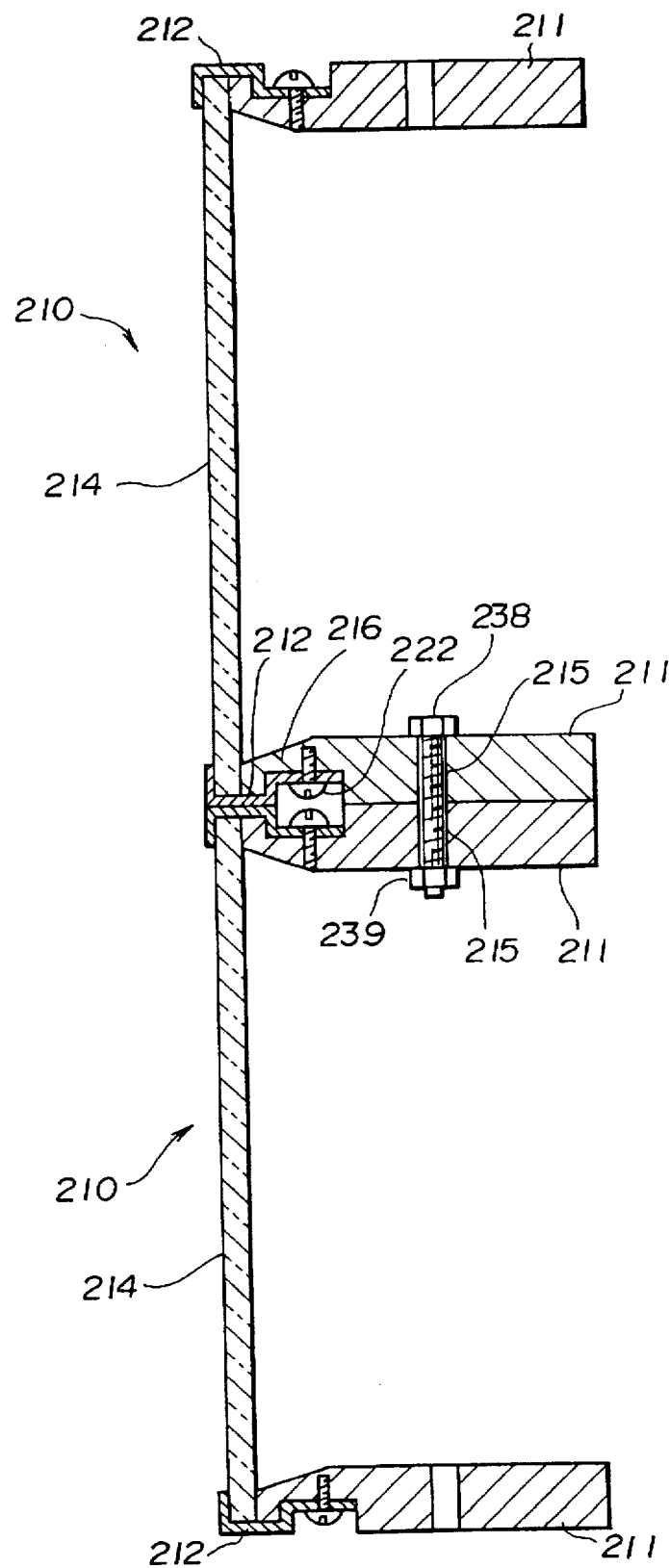
FIG. 36 is a sectioned view showing the Fresnel lens fitting unit in FIG. 33.

FIG. 36 is a sectioned view showing the Fresnel lens fitting unit 210 as assembled.

When the Fresnel lens fitting units 210 are as assembled, the through holes 215 of the adjacent Fresnel lens fitting frames 211 will communicate with each other. The bolt 238 will be inserted through such communicating through holes 215 and screwed into the screw hole of the nut 239 to fix the adjacent Fresnel lens fitting frames 211. Here, as the Fresnel lens fitting part 216 of the Fresnel lens fitting frame 211 is formed to be smaller in the diameter by the thickness of the pad 211, the adjacent pads 212 will be in contact with each other. Further, as a step part 217 is formed in the Fresnel lens fitting part 216 and the screwed part 220 of the pad 212 is bent in conformity to the step part 217, the screws 222 will not contact with each other. Further, in case Fresnel lens 214 expands or contracts, the Fresnel lens 214 will be stably held by the spring effect of the pad 212.

Figure 62:
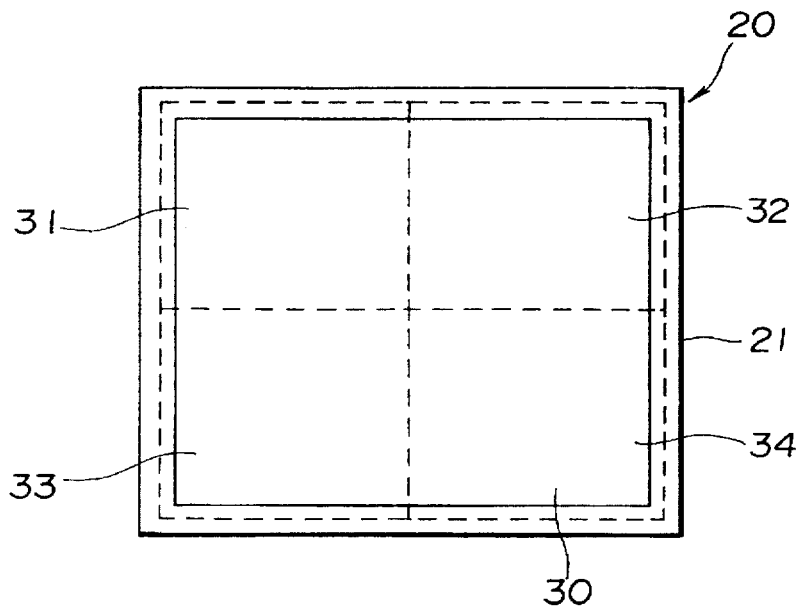
FIG. 62 is a side view showing the front surface part of a conventional multiscreen display.
Figures 63, 64:
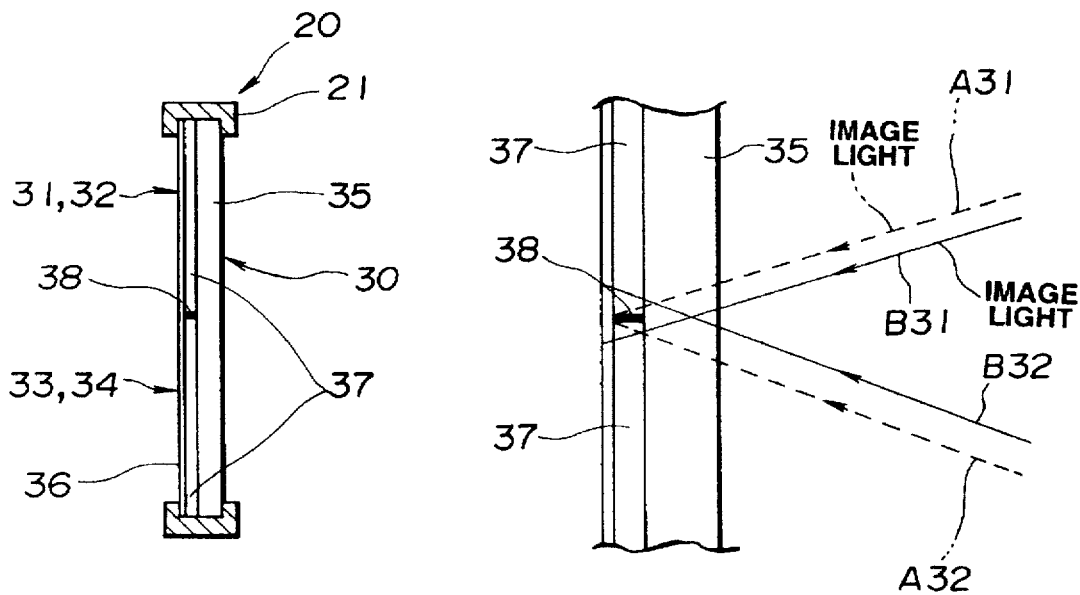
FIG. 63 is a sectioned view of a front surface part of FIG. 62.
FIG. 64 is an explanatory view explaining the prevention of the interference with image lights of the multiscreen display in FIG. 63.

According to such embodiment, in the front surface part unit 201 of the multiscreen display, even when the lag of the image lights from the projecting units is large, by the Fresnel lens fitting frame 211 of the lenticular lens fitting unit 210, the image light from the projecting unit can be prevented from being projected to a Fresnel lens corresponding to another projecting unit and the image lights can be prevented from interfering with each other. Further, in the front surface part unit 201 of the multiscreen display, the lenticular lens fitting unit 230 can be removed by removing the bolts 235 (See FIGS. 33 and 34) to the front surface side from the Fresnel lens fitting units 210 as assembled, the Fresnel fitting units 210 can be disassembled one by one by removing the bolts 238 and therefore such handlability as in moving, conveying and installing them can be improved. Further, the Fresnel lens 214 is individually fitted by the Fresnel lens fitting frame 211 formed of such light and tough material as an aluminum alloy and therefore the structure is lighter than in the conventional example shown in FIG. 62.

Figure 37:
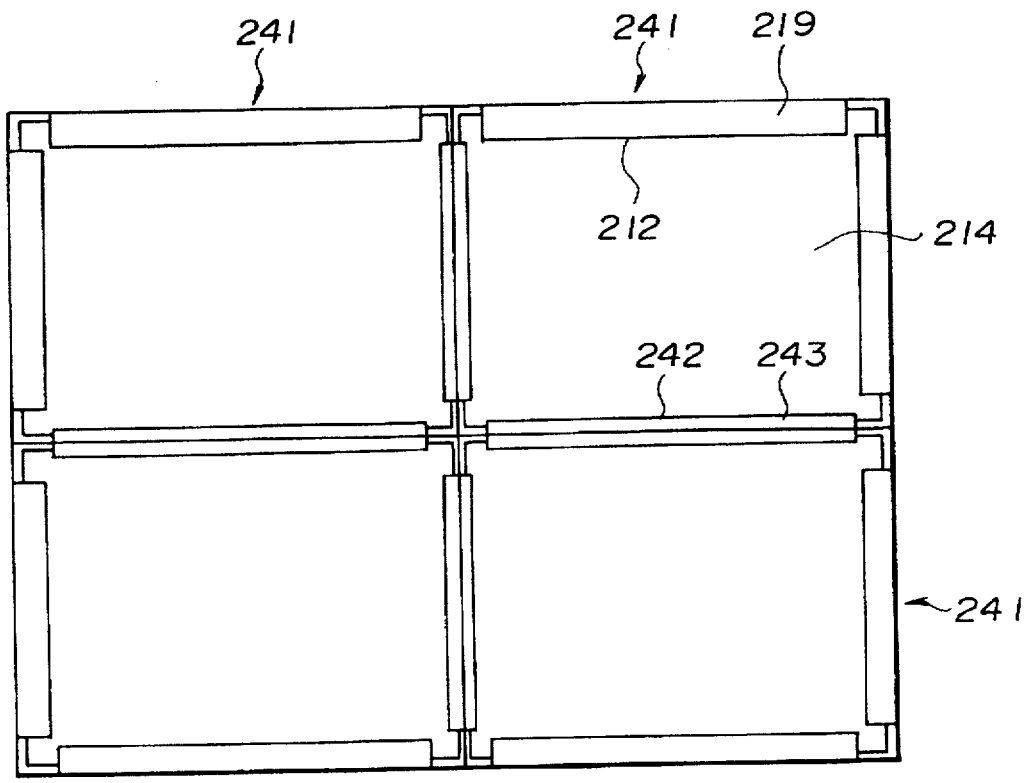
FIG. 37 is a front surface view a Fresnel lens fitting unit showing a modification of the embodiment in FIG. 31.

FIG. 37 is an elevation of the Fresnel lens fitting unit as assembled, showing a modification of the embodiment in FIG. 31. The same components as in the embodiment in FIG. 31 shall bear the same reference numerals and shall not be explained.

In FIG. 37, the difference of this embodiment is that the locking piece 243 of the pad (inside pad) 242 positioned on the adjacent surfaces of the Fresnel lens fitting units 241 as assembled is formed to be shorter in the width to the Fresnel lens 214 side than the locking piece 219 of the pad (outer peripheral side pad) 212 positioned on the outer periphery. The other formations than this are the same as in the embodiment in FIG. 1.

Figure 38:
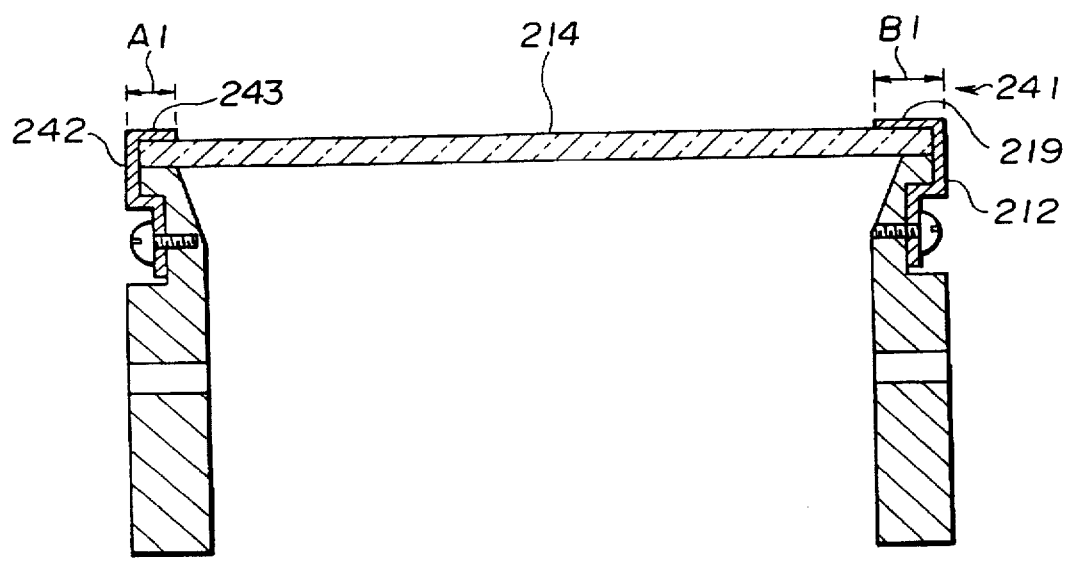
FIG. 38 is a sectioned view of the Fresnel lens fitting unit in FIG. 37.

FIG. 38 is a sectioned view of the Fresnel lens fitting unit 241 in FIG. 37.

In FIG. 38, the width A1 of the locking piece 243 of the pad 242 on the surface of the Fresnel lens fitting unit adjacent to the other Fresnel lens fitting unit 241 is formed to be a width about half the width B1 of the locking piece 219 of the pad 212 on the outer periphery. Here, when the Fresnel lens fitting unit 241 is assembled, the adjacent pads 42 will be in contact with each other and the pad 242 will not bend and, even if the locking piece 243 is short, the Fresnel lens 214 will be able to well prevent the Fresnel lens 214 from dropping.

According to such modification, the locking piece 243 between the adjacent Fresnel lenses 214 can be made inconspicuous and therefore a high impression can be given to the receivers.

Figure 39:
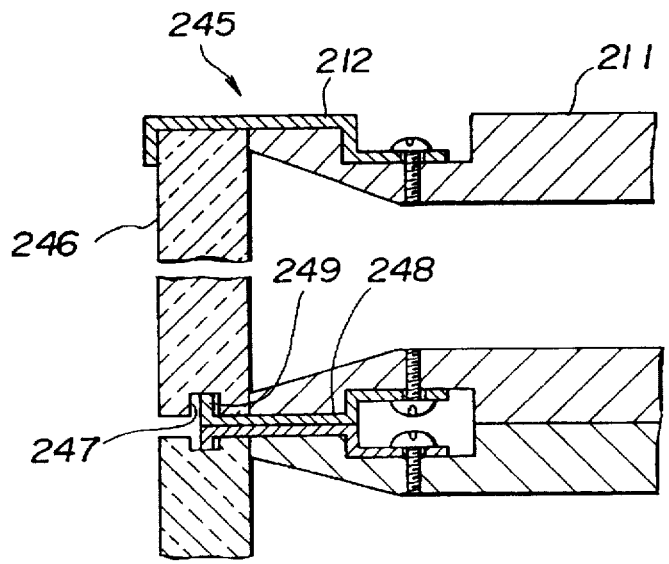
FIG. 39 is a sectioned view of an essential part showing the eighth embodiment of a multiscreen display of the present invention.

FIG. 39 is a sectioned view of an essential part, showing the eighth embodiment of a multiscreen display of the present invention. The same components as in FIG. 31 shall bear the same reference numerals and shall not be explained.

In FIG. 39, the Fresnel lens 246 of the Fresnel lens fitting unit 245 has a groove part 247 formed in an intermediate position in front and rear of the side surface adjacent to the other Fresnel lens 246. The pad 248 positioned on the surface adjacent to the Fresnel lens fitting units 245 as assembled has the locking piece 249 formed in the position corresponding to the above mentioned groove part 247. The other formations are the same as in the embodiment in FIG. 31.

According to such embodiments, the locking piece 249 between the adjacent Fresnel lenses 246 can be made more inconspicuous and has the effects shown in the following.

Figure 40:
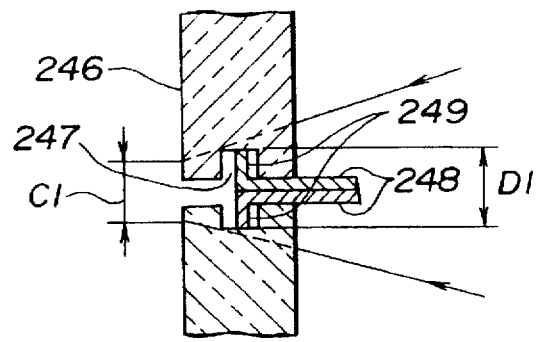
FIG. 40 is an explanatory view showing the effect of the embodiment in FIG. 39.
Figure 40:
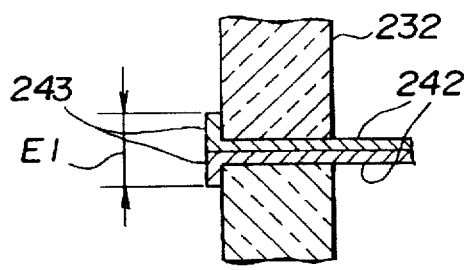

FIG. 40 is an explanatory view showing the effects of such embodiments. FIG. 40(a) shows the locking piece and its peripheral part of the embodiment in FIG. 39. FIG. 40(b) shows the locking piece and its peripheral part of the embodiment in FIG. 37.

The width D1 of the locking pieces 249 consisting of the laminated pads 48 in this embodiment shown in FIG. 40(a) is set to be the same as the width E1 of the locking pieces 243 consisting of the laminated pads 242 in the embodiment in FIG. 37 shown in FIG. 40(b). However, as shown in FIG. 40(a), as the groove part 247 is formed on the back surface side rather than on the surface of the Fresnel lens 246, the width C1 produced when the image light is shielded by this groove part 247 will be smaller than the width E1 by the locking pieces 243 shown in FIG. 40(b). As a result, the boundary of the image can be made more inconspicuous than in the embodiment in FIG. 37. In this case, the diffused reflection of the image light may be considered. However, in this case, it will be able to be solved by black painting.

Figure 41:
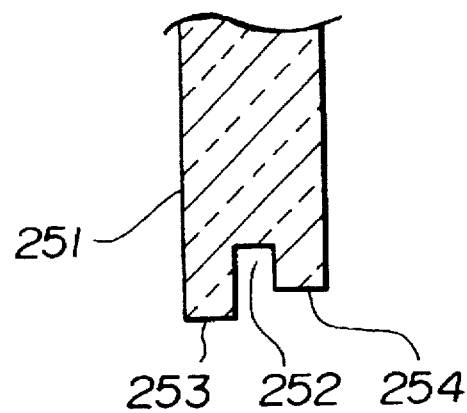
FIG. 41 is a sectioned view showing an essential part of a modification of the embodiment in FIG. 39.

FIG. 41 is a sectioned view showing the essential part of the modification of the embodiment in FIG. 39.

In the embodiment in FIG. 41, the front surface side 253 rather than the groove part 252 of the Fresnel lens 251 is formed to be longer by ½ the thickness of the pad than the back surface side 254.

Figure 42:
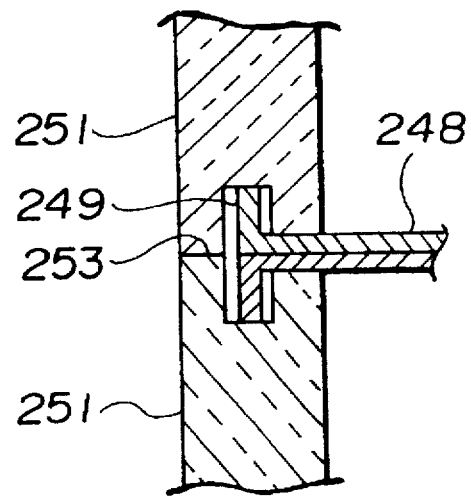
FIG. 42 is a sectioned view showing as assembled a Fresnel lens fitting unit in the modification in FIG. 41.

FIG. 42 is a sectioned view showing the Fresnel lens fitting unit as assembled of the modification in FIG. 41.

In FIG. 42, in the Fresnel lens fitting unit as assembled, the front surface sides 253 of the adjacent Fresnel lenses 251 are in contact with each other and therefore the boundary of the Fresnel lenses 251 can be made more inconspicuous. In case the projecting unit is off, the locking piece 249 of the pad 248 as seen from the semitransparent lenticular lens will be substantially invisible and a more favorable impression will be able to be given to the receivers.

Figure 43:
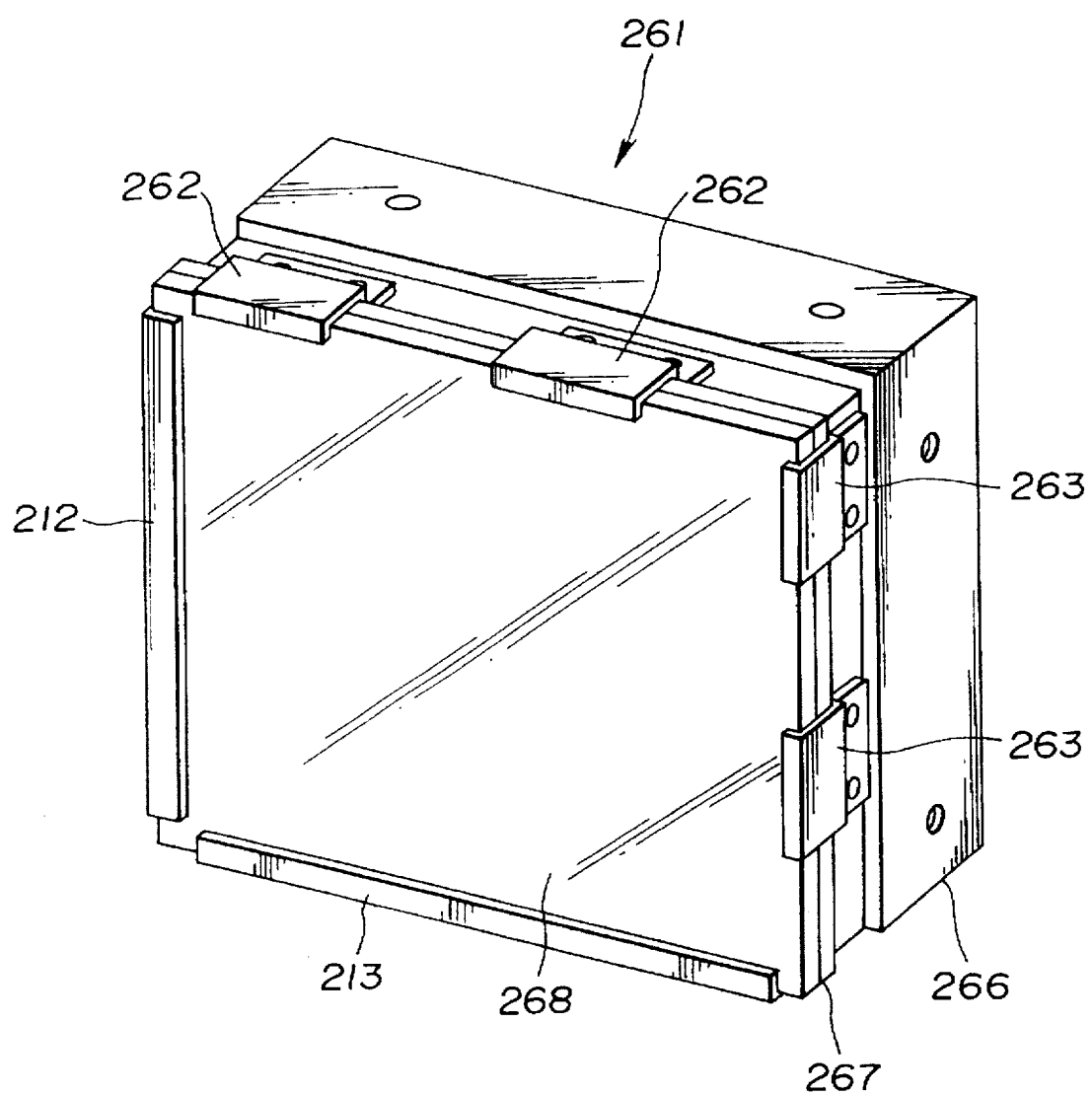
FIG. 43 is an elevation of a Fresnel lens fitting unit showing the ninth embodiment of a multiscreen display of the present invention.

FIG. 43 is an elevation of the Fresnel lens fitting unit, showing the ninth embodiment of a multiscreen display of the present invention. The same components as in FIG. 31 shall bear the same reference numerals and shall not be explained.

In FIG. 43, two pads (inside pads) 262 are provided on each of the upper and lower adjacent surfaces of the Fresnel lens fitting unit 261. Also, two pads 263 are provided on each of the right and left adjacent surfaces of the Fresnel lens fitting unit 261. The pads 262 and 263 are formed respectively to be somewhat smaller than ¼ the outer peripheral pads (outer peripheral side pads) 212 and 213. The Fresnel lens 268 is fitted to the fitting part 267 of the Fresnel lens fitting frame 266.

Figure 44:
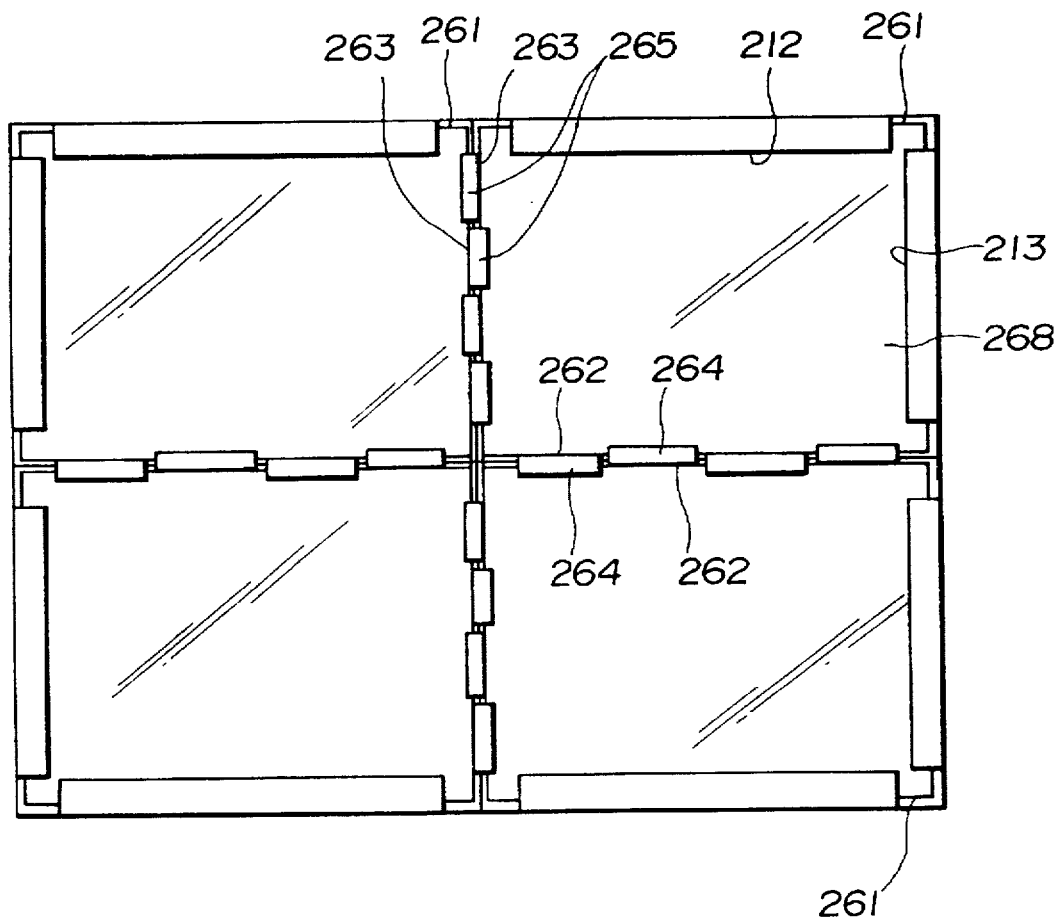
FIG. 44 is an elevation showing as assembled the Fresnel lens fitting unit in FIG. 43.

FIG. 44 is an elevation showing the Fresnel lens fitting unit shown in FIG. 43 as assembled.

In FIG. 44, the locking pieces 264 of the pads 262 are provided discontinuously alternately between the upper and lower adjacent Fresnel lens fitting units 261. In the same manner, the locking pieces 265 of the pads 263 are provided discontinuously alternately between the right and left adjacent Fresnel lens fitting unit 261.

Figure 45:
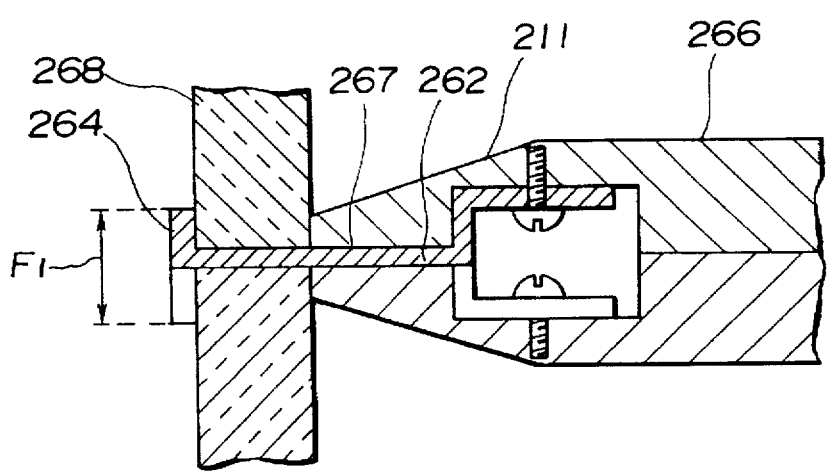
FIG. 45 is a sectioned view showing as assembled the Fresnel lens fitting unit in FIG. 43.

FIG. 45 is a sectioned view showing the Fresnel lens fitting unit shown in FIG. 43 as assembled.

The Fresnel lens fitting part 267 of the Fresnel lens fitting frame 266 is formed to be smaller in the diameter than the outer periphery of the Fresnel lens fitting frame 266 by ½ the thickness of the pad 262 and therefore the pad 262 will be in contact with both of the adjacent Fresnel lens fitting parts 267. Thereby, the width F1 of the shielded part of the Fresnel lens 268 by the locking piece 264 (locking piece 265) can be made smaller than in the embodiment in FIG. 37 by half the thickness of the pad 262 (pad 263).

Figure 46:
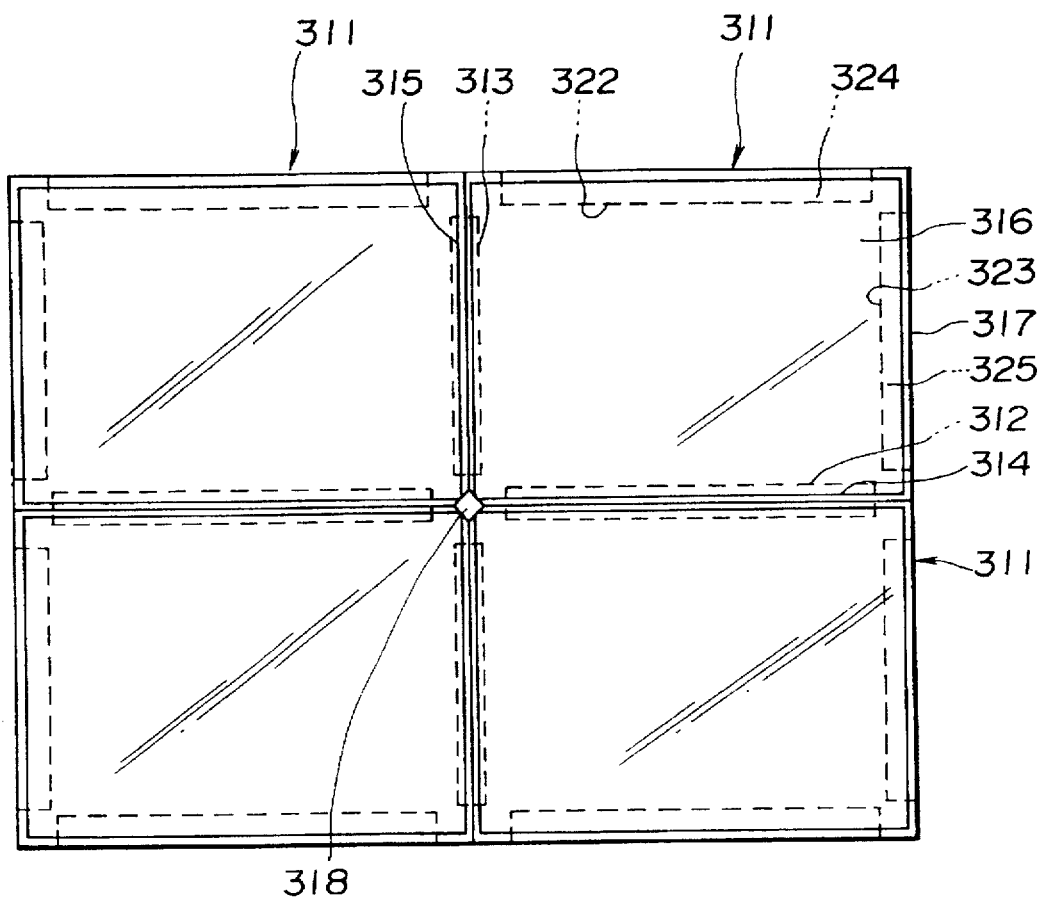
FIG. 46 is an elevation of a Fresnel lens fitting unit showing the tenth embodiment of a multiscreen display of the present invention.

FIG. 46 is an elevation of the Fresnel lens fitting unit, showing the tenth embodiment of a multiscreen display of the present invention.

As shown in FIG. 46, groove parts are formed on the outer peripheries of the Fresnel lenses 315 of the Fresnel lens fitting units 311 and the locking pieces 314, 315, 324 and 325 of the pads 312, 313, 322 and 323 are inserted in these groove parts. The locking pieces 314 and 315 of the pads 312 and 313 positioned on the surfaces adjacent to each other of the Fresnel lens fitting units 311 are formed to be shorter in the width to the Fresnel lens 316 side than the locking pieces 324 and 325 of the pads 322 and 323 of the pad 12 positioned on the outer periphery. The Fresnel lens 316 and Fresnel lens fitting frame 317 in the overlapping part of the corners of the Fresnel lens fitting units 311 are cut off and a square through 318 is formed in this part.

Figure 47:
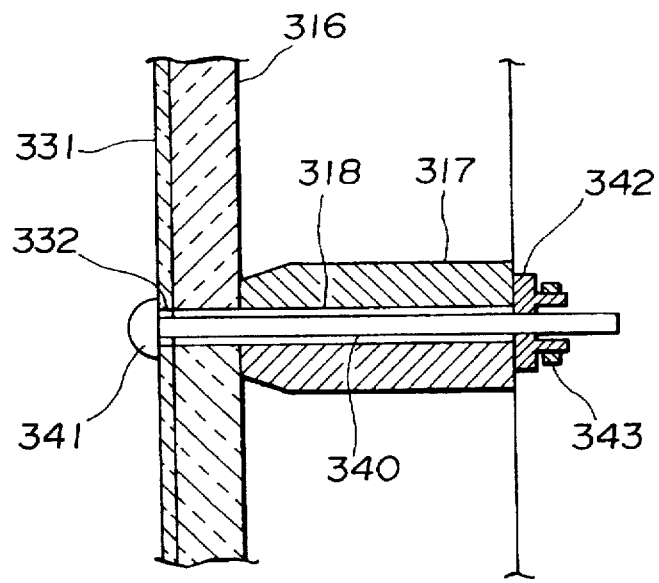
FIG. 47 is a sectioned view showing an essential part of the embodiment in FIG. 46.

FIG. 47 is a sectioned view showing the essential part of the embodiment in FIG. 46.

As shown in FIG. 47, a through hole 322 is formed in the position corresponding to the above mentioned through hole 318 of the lenticular lens 331. A pin 340 is inserted in the through holes 318 and 332 from the front surface side. A flange 341 of a diameter larger than of the through hole 332 is formed on the front surface side of the pin 340. A partly cut-off ring-shaped fastening metal fixture is fitted to the part projecting out of the back surface side of the Fresnel lens fitting frame 317 of the pin 340. The fastening metal fixture 342 will be fitted and fixed to the other end side of the pin. 340 by a rubber ring 343 when the distance from the flange is well shortened. Thereby, the lenticular lens 331 will be pressed into contact with the Fresnel lens 331.

According to such embodiment, there are the same effects as in the embodiment in FIG. 39, even in case the picture is formed to be large, the lenticular lens 331 will be able to be prevented from flexing and to be pressed into contact with the Fresnel lens 316, the external light will be able to be prevented from being seen as partly reflected by the flexing of the lenticular lens and the image will be able to be prevented from being seen as distorted.

Figure 48:
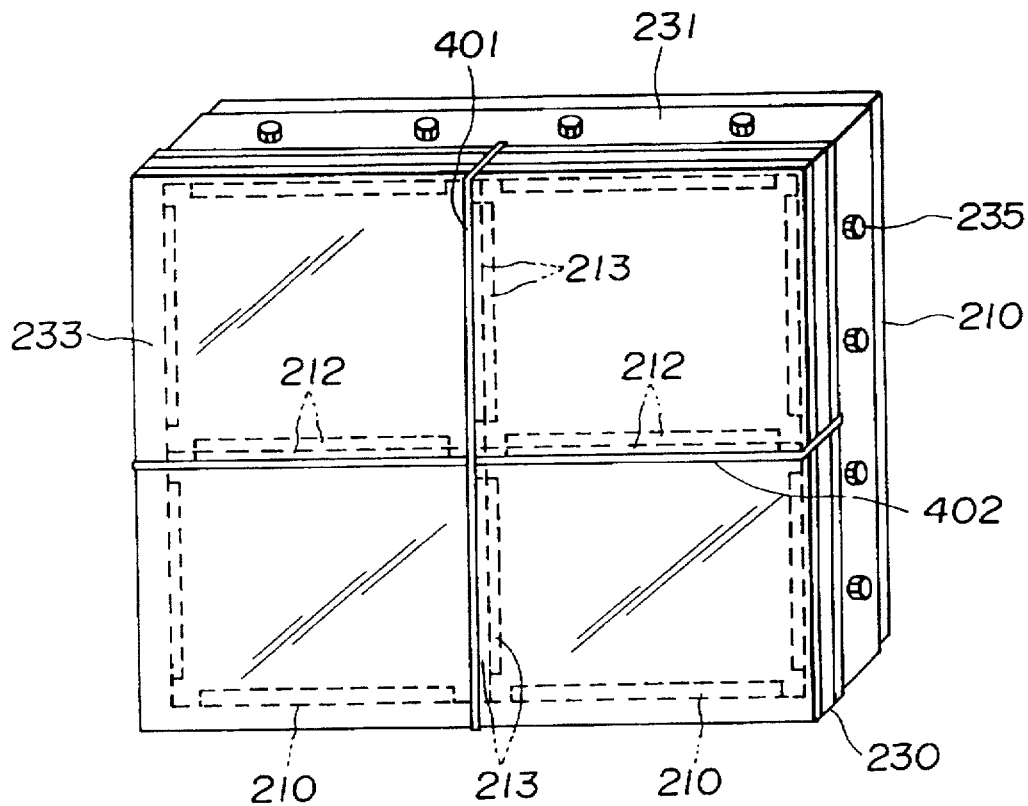
FIG. 48 is a perspective view showing the 11th embodiment of a multiscreen display of the present invention.

FIG. 48 is a perspective view showing the 11th embodiment of a multiscreen display of the present invention. The same components as in the embodiments shown in FIGS. 31 to 38 shall bear the same reference numerals and shall not be explained.

In FIG. 48, a wire 401 is fitted at one end to the central part on the upper side of the lenticular lens fitting frame 231, is fitted at the other end to the central part on the lower side of the lenticular lens fitting frame 231 and is stretched in the intermediate part to the front surface side of the lenticular lens 233 coinciding with the contact surface of the adjacent pad 213 in the vertical direction.

A wire 402 is fitted at one end to the central part on the right side of the lenticular lens fitting frame 231, is fitted at the other end to the central part on the left side of the lenticular lens fitting frame 231 and is stretched in the intermediate part to the front surface side of the lenticular lens 233 coinciding with the contact surface of the adjacent pad 212 in the horizontal direction.

Figure 49:
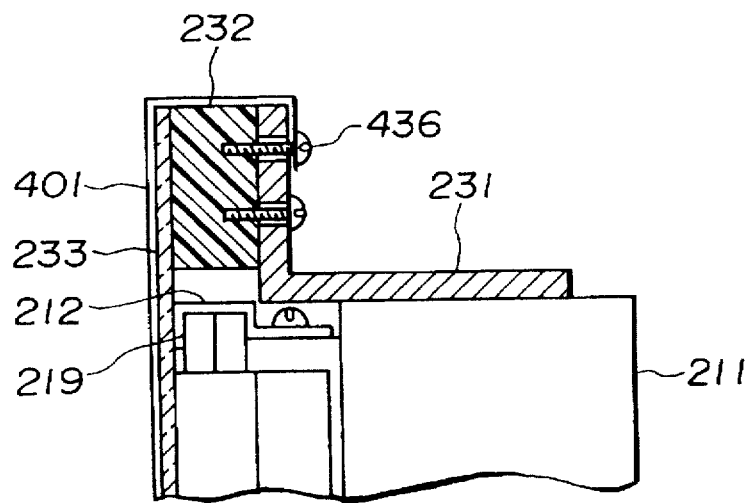
FIG. 49 is a sectioned view showing a wire fitting part in FIG. 48.

FIG. 49 is a sectioned view of the wire fitting part in FIG. 48. The same components as in the embodiments shown in FIGS. 31 to 38 shall bear the same reference numerals and shall not be explained.

As shown in this drawing, the lenticular lens fitting frame 231 of the lenticular lens fitting unit 230 is formed to be L-shaped with the front surface side directed outside and a reinforcing piece 232 is screwed and fixed to this part with screws 436. The wire 401 on one end side is wound and tied between the screw head of the screw 436 and the lenticular lens fitting frame 231 so as to be fitted to the central part on the upper side of the lenticular lens fitting frame 231. Though not illustrated, the wire 401 at the other end and the wire 402 at one end and the other end are fitted in the same manner as in the wire 401.

According to such embodiment, the same effects as in the embodiment in FIG. 46 can be obtained with the low cost wires 401 and 402. Here, the wires 401 and 402 are provided in the positions overlapping the pads 212 and 213 and therefore can be made well inconspicuous.

Figure 50:
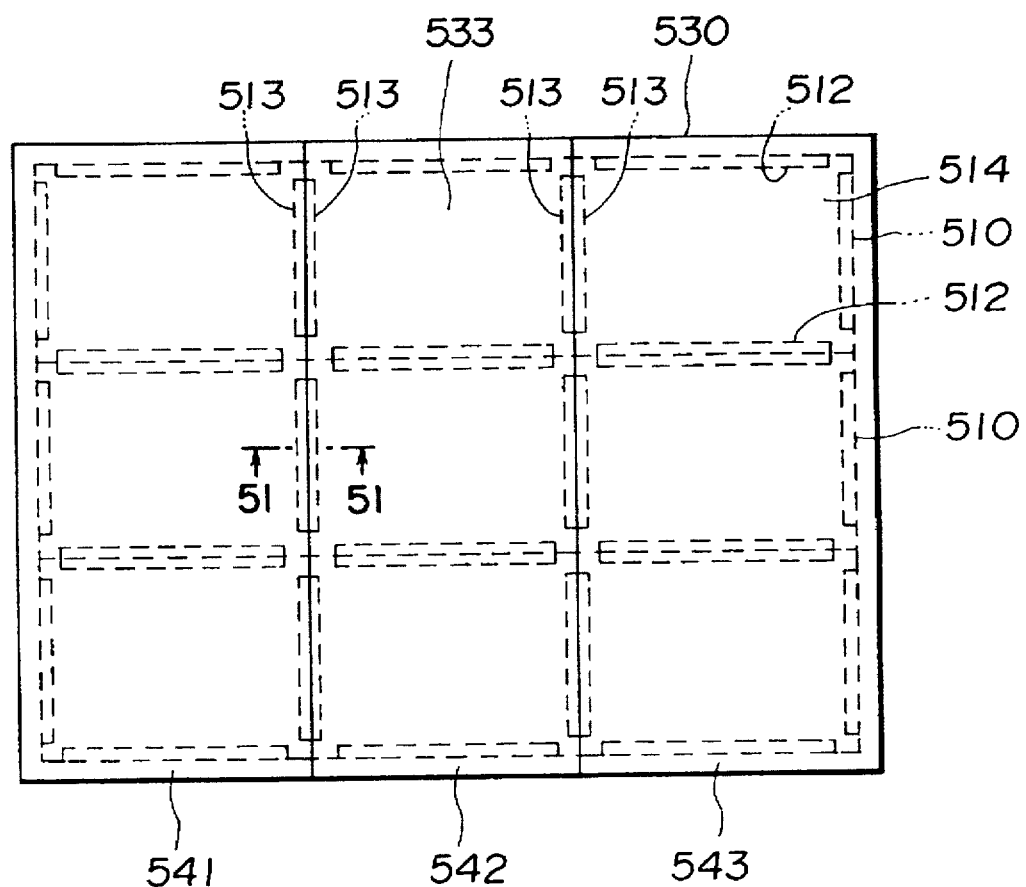
FIG. 50 is a perspective view showing the 12th embodiment of a multiscreen display of the present invention.

FIG. 50 is a perspective view showing the 12th embodiment of a multiscreen display of the present invention.

In FIG. 50, the lenticular lens fitting unit 530 as having the Fresnel ions fitting units 510 as assembled in three vertical rows and three horizontal rows inserted from the back surface side is fitted to the Fresnel lens fitting units 510. The Fresnel lens fitting unit 510 is fitted with the Fresnel lens 514 by the upper and lower pads 512 and the right and left pads 513 on the front surface side of the Fresnel lens fitting frame 211.

The lenticular lens 533 is divided into three lenticular lenses 541, 542 and 543 by dividing tangential lines in the vertical direction overlapping on the contact surfaces of the right and left pads 513 and is fitted on the Fresnel lens fitting unit 510 by using the lenticular lens fitting frame.

Figure 51:
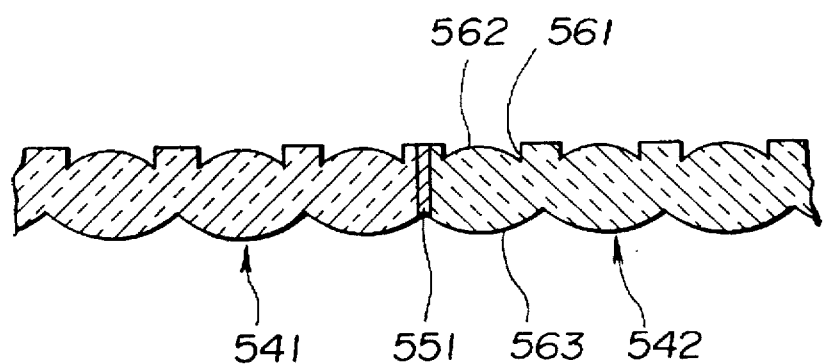
FIG. 51 is a sectioned view on line B—B of a lenticular lens in FIG. 50.

FIG. 51 is a sectioned view on line B—B of the lenticular lens shown in FIG. 50.

The lenticular lenses 541 and 542 are bonded with each other by a bonding agent 551.

On the front surface side of the lenticular lenses 541 and 542, a plurality of groove parts 561 in the vertical direction are formed as arranged on the right and left. The bottom part of this groove part 561 is formed to be an arcuate projection 562.

On the back surface side of the lenticular lenses 541 and 542, a plurality of arcuate projections 563 in the vertical direction are formed as arranged.

According to such embodiment, there are the same effects as in the embodiment in FIG. 31. In case the multiscreen is made for a large picture, the lenticular lens will have to be formed as divided into a plurality so as to be die-formed. In such case, the joint (bonded part by the bonding agent 551) will be able to be made inconspicuous.

Figure 52:
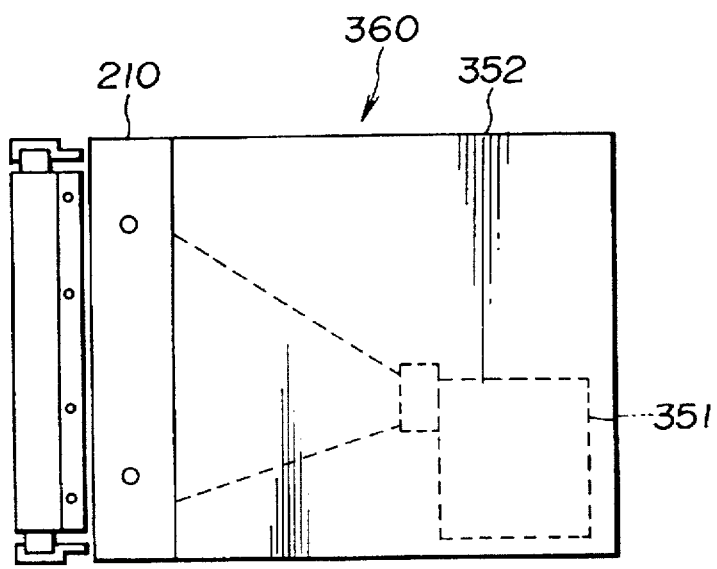
FIG. 52 is a side view showing the 13th embodiment of a multiscreen display of the present invention.
Figure 53:
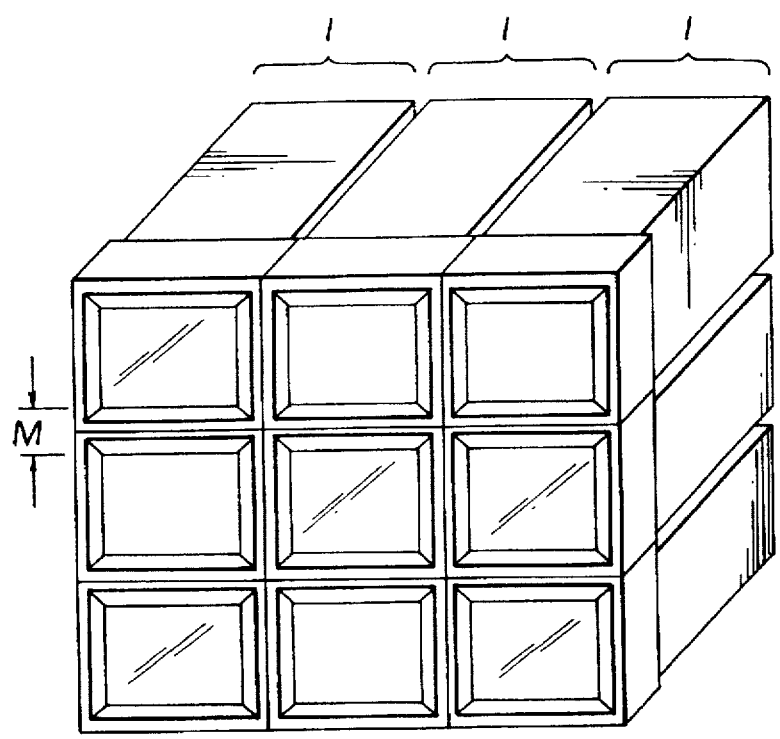
FIG. 53 is a perspective view showing a conventional multiscreen display.
Figure 54:
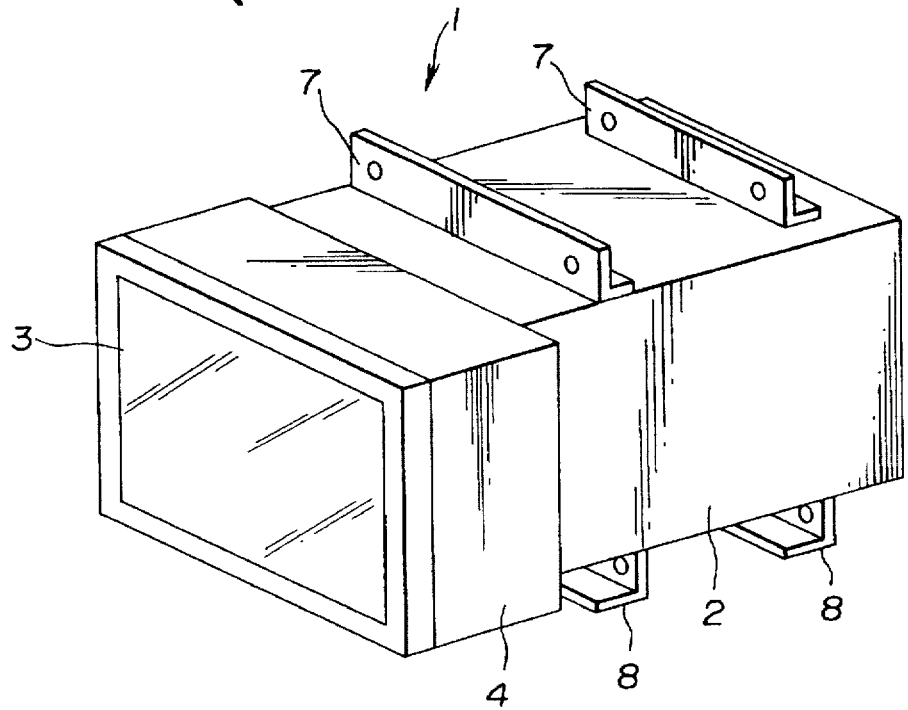
FIG. 54 is an appearance view showing an example of unit display.
Figure 55:
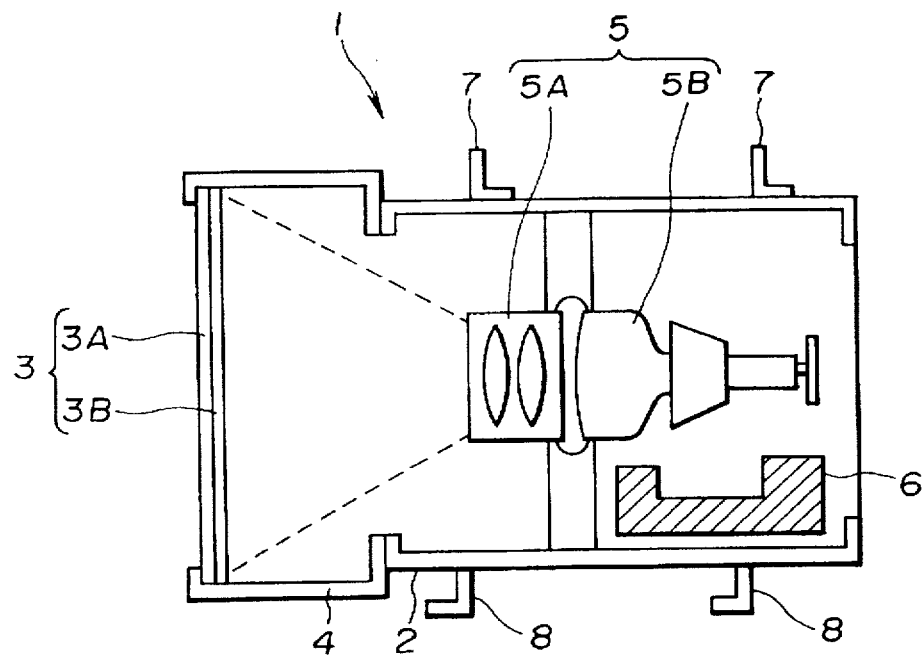
FIG. 55 is a vertically sectioned view of FIG. 54.
Figure 56:
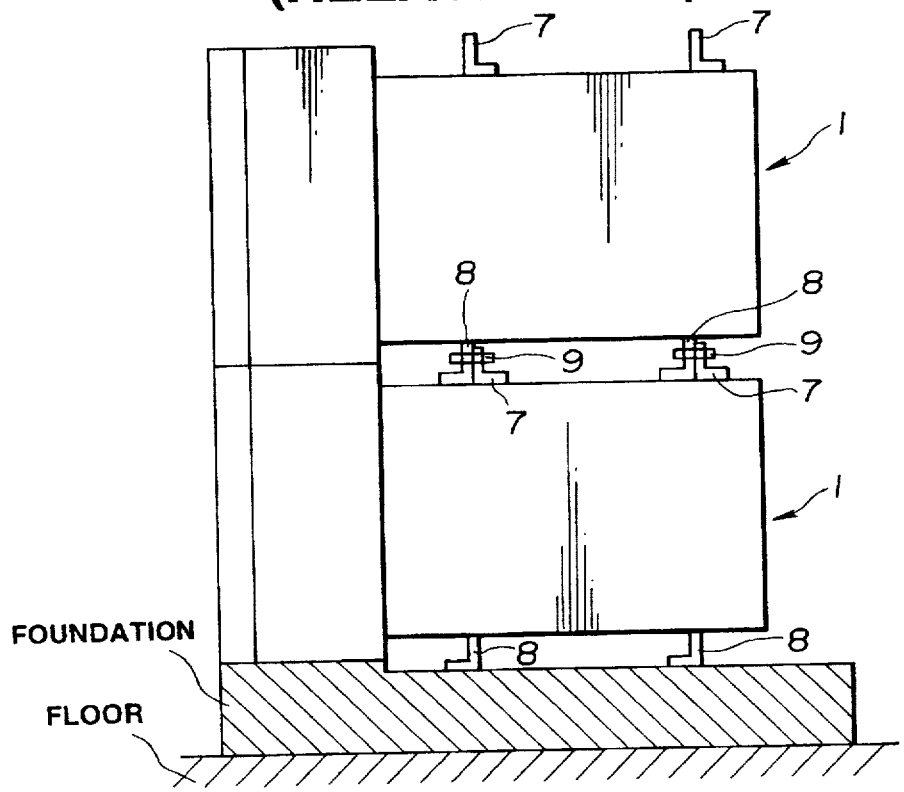
FIG. 56 is a side view of unit displays as heaped in steps.

FIG. 52 is a side view showing a unit display in the 13th embodiment of a multiscreen display of the present invention.

In this embodiment, a projecting unit 351 is inserted in an individual cabinet 352 and the same Fresnel lens fitting unit 210 as in FIG. 31 is fitted to the front surface side of this cabinet to form a single unit display 360. In this embodiment, the unit displays 360 are assembled vertically and horizontally and further the lenticular lens fitting units 230 in FIG. 31 are fitted. The connecting means for connecting and assembling a plurality of unit displays 360 vertically and horizontally may be provided at least in either of the cabinet 352 and Fresnel lens fitting unit 210.

According to such embodiment, there are the same effects as in FIG. 31 and, if the multiscreen display is assembled as in FIG. 52 and the optical position such as focusing is finely adjusted in the factory, the fine adjustment and installing operation in the setting place will be able to be simplified.

By the way, in the embodiments shown in FIGS. 31 to 49 and FIG. 52, the front surface part of the multiscreen display is formed of a total of four of Fresnel lens fitting units of two vertical rows and two horizontal rows. However, the arrangement and number of the Fresnel lens fitting units may be separately set. For example, the front surface part may be formed of a total of nine Fresnel lens fitting units of three vertical rows and three horizontal rows. In the embodiments shown in FIGS. 50 and 51, the front surface part of the multiscreen display is formed of a total of nine Fresnel lens fitting units of three vertical rows and three horizontal rows. However, the arrangement and number of the Fresnel lens fitting units may be separately set. For example, the front surface part may be formed of a total of 16 Fresnel lens fitting units of four vertical rows and four horizontal rows. Also, in the embodiments shown in FIG. 48, a wire is used as a linear member to be stretched on the front surface side of the lenticular lens 33 but another linear member such as a thread of synthetic fibers may be used.

According to the above described embodiments in FIGS. 31 to 52, even when the lag of the image light from the projecting unit is large, the interference with the image light will be able to be prevented and, in case the picture is made large, the handlability will be able to be improved.

By the way, the present invention is not limited to only the above described embodiments but can be variously modified and worked without deviating from the subject matter of the invention.

What is claimed is:

1. A multiscreen display comprising:
   a plurality of Fresnel lenses;
   a plurality of Fresnel lens fitting frames, each Fresnel lens being respectively fitted on a front side of a corresponding Fresnel lens fitting frame;
   a plurality of projecting units respectively projecting an image toward a back surface side of the Fresnel lenses;
   connecting means provided on a side surface of the Fresnel lens fitting frames for connecting the projection units;
   a lenticular lens; and
   a lenticular lens fitting frame, the lenticular lens being fitted on a front surface side of the lenticular lens fitting frame, a plurality of the Fresnel lens fitting frames being inserted into a back surface side of the lenticular lens fitting frame.

2. A multiscreen display comprising:
   a plurality of Fresnel lenses;
   a plurality of Fresnel lens fitting frames, each Fresnel lens being respectively fitted on a front side of a corresponding Fresnel lens fitting frame;
   a plurality of projecting units respectively projecting an image toward a back surface side of the Fresnel lenses;
   connecting means provided on a side surface of the Fresnel lens fitting frames for connecting the projecting units;

pads having a locking piece formed on one end locking the Fresnel lens and having another end fitting the Fresnel lens to the Fresnel lens fitting frame when the Fresnel lens is fitted and fixed to the Fresnel lens fitting frame;

a lenticular lens; and a lenticular lens fitting frame, the lenticular lens being fitted on a front surface side of the lenticular lens fitting frame, a plurality of the Fresnel lens fitting frames being inserted into a back surface side of the lenticular lens fitting frame.

3. A multiscreen display comprising:

a plurality of Fresnel lenses;

a plurality of Fresnel lens fitting frames, each Fresnel lens being respectively fitted on a front side of a corresponding Fresnel lens fitting frame;

a plurality of projecting units respectively projecting an image toward a back surface side of the Fresnel lenses;

connecting means for connecting the projection units;

outer peripheral side pads having a locking piece on one end locking the positioned Fresnel lenses and having another end fitting the Fresnel lenses that are fitted and fixed to outer peripheries of the Fresnel lens fitting frames;

inside pads having a locking piece, the inside pads locking a Fresnel lens to the Fresnel lens fitting frames when the Fresnel lens is fitted and fixed to adjacent surfaces of multiple Fresnel lens fitting frames to the Fresnel lens fitting frames, one side of the inside pads being shorter than the outer peripheral side pads;

a lenticular lens; and a lenticular lens fitting frame, the lenticular lens being fitted on a front surface side of the lenticular lens fitting frame, a plurality of the Fresnel lens fitting frames being inserted into a back surface side of the lenticular lens fitting frame.

4. A multiscreen display comprising:

a plurality Fresnel lenses;

a plurality of Fresnel lens fitting frames, each Fresnel lens being respectively fitted on a front side of a corresponding Fresnel lens fitting frame;

a plurality of projecting units respectively projecting an image toward a back surface side of the Fresnel lenses;

connecting means provided on the side surface of the Fresnel lens fitting frames for connecting the projection units;

pads fabricated from a resilient member, each pad having a locking piece formed on one end locking the Fresnel lens and having another end fitting the Fresnel lens to the Fresnel lens fitting frame when the Fresnel lens is fitted and fixed to the Fresnel lens fitting frame;

a lenticular lens; and a lenticular lens fitting frame, the lenticular lens being fitted on a front surface side of the lenticular lens fitting frame, a plurality of the Fresnel lens fitting frames being inserted into a back surface side of the lenticular lens fitting frame.

5. A multiscreen display comprising:

a plurality of Fresnel lenses having a groove part formed on the periphery;

a plurality of Fresnel lens fitting frames;

a plurality of projecting units projecting an image toward a back surface side of the Fresnel lenses;

connecting means provided on the side surface of the Fresnel lens fitting frames for connecting the projecting units;

pads having a locking piece formed on one end locking the groove part of the Fresnel lens and having another end fitting the Fresnel lens to the Fresnel lens fitting frame when the Fresnel lens is fitted and fixed to the Fresnel lens fitting frame;

a lenticular lens; and a lenticular lens fitting frame, the lenticular lens being fitted on a front surface side of the lenticular lens fitting frame, a plurality of the Fresnel lens fitting frames being inserted into a back surface side of the lenticular lens fitting frame.

6. A multiscreen display according to claim 5 characterized in that said Flesnel lens is formed so that the outer periphery on the front surface side of said groove part is larger than the outer periphery on the back surface side.

7. A multiscreen display characterized by comprising:

a plurality of Fresnel lenses, a Fresnel lens through hole being positioned at a point of intersection between four of the Fresnel lenses;

a plurality of Fresnel lens fitting frames, a Fresnel lens fitting frame through hole being positioned at a point of intersection between four of the Fresnel lens fitting frames, each Fresnel lens being respectively fitted on a front side of a corresponding Fresnel lens fitting frame;

a plurality of projecting units respectively projecting an image toward a back surface side of the Fresnel lenses;

connecting means provided on a side surface of the Fresnel lens fitting frames for connecting the projecting units;

a lenticular lens, a lenticular lens through hole being positioned in a part of the lenticular lens corresponding to the Fresnel lens through hole;

a lenticular lens fitting frame, the lenticular lens being fitted on a front surface side of the lenticular lens fitting frame, a plurality of the Fresnel lens fitting frames being inserted into the lenticular lens fitting frame into a back surface side of the lenticular lens fitting frame;

a pin having a flange locking on a periphery of the lenticular lens through hole, the pin having a shaft extending through the lenticular lens through hole, the Fresnel lens through hole and the Fresnel lens fitting frame through hole, the pin projecting on the back surface side of the Fresnel lens fitting frames; and a pin fixing member having an outside diameter larger than a diameter of the Fresnel lens fitting frame through hole, the pin fixing member being fitted and fixed to the pin projecting toward the back surface side of the Fresnel lens fitting frames.

8. A multiscreen display comprising:

a plurality of Fresnel lenses;

a plurality of Fresnel lens fitting frames, each Fresnel lens being respectively fitted on a front side of a corresponding Fresnel lens fitting frame;

a plurality of projecting units respectively projecting an image toward a back surface side of the Fresnel lenses;

connecting means provided on a side surface of the Fresnel lens fitting frames for connecting the projecting units;

pads having a locking piece formed on one end and having another end fitting the Fresnel lens to the Fresnel lens fitting frame when the Fresnel lens is fitted and fixed to the Fresnel lens fitting frame;

a lenticular lens; and a lenticular lens fitting frame, the lenticular lens being fitted on a front surface side of the lenticular lens fitting frame, a plurality of the Fresnel lens fitting frames being inserted into a back surface side of the lenticular lens fitting frame; and linear members fixed to an outer periphery of the lenticular lens fitting frame, respectively, the linear members being stretched across the lenticular lens in a position overlapping the pads on the front surface side of the lenticular lens.

9. A multiscreen display comprising:

a plurality of Fresnel lenses;

a plurality of Fresnel lens fitting frames, each Fresnel lens being respectively fitted on a front side of a corresponding Fresnel lens fitting frame;

a plurality of projecting units projecting an image toward a back surface side of the Fresnel lenses;

connecting means provided on the side surface of the Fresnel lens fitting frames for connecting the projecting units;

right and left pads each having a locking piece formed on one end of the pad and each having another end fitting the Fresnel lenses to the Fresnel lens fitting frames when the Fresnel lenses are fitted and fixed on the right and left sides of the Fresnel lens fitting frames;

a plurality of lenticular lenses of a vertical stripe form, the lenticular lenses diffusing image lights through the Fresnel lenses on the right and left sides of the Fresnel lens fitting frames, the lenticular lenses being divided by dividing lines in a vertical direction, the dividing lines overlapping with the right and left pads;

a bonding agent bonding a plurality of the lenticular lenses; and a lenticular lens fitting frame, the lenticular lenses being fitted on a front surface side of the lenticular lens fitting frame, a plurality of the Fresnel lens fitting frames being inserted into a back surface side of the lenticular lens fitting frame.

10. A multiscreen display characterized by comprising:

a plurality of Fresnel lenses;

a plurality of projecting units respectively projecting image lights to a plurality of said Fresnel lenses;

a plurality of cabinets opened on the front surface side and respectively containing inside a plurality of said projecting units;

a plurality of Fresnel lens fitting frames formed to be frame-shaped and having a plurality of said Fresnel lenses respectively fitted on the front surface side and the front surface sides of a plurality of said cabinets respectively fitted on the back surface side;

a connecting means provided on at least either of a plurality of the cabinet and a plurality of the Fresnel lens fitting frames and connecting and assembling with one another a plurality of the cabinets having a plurality of the Fresnel lens fitting frames respectively fitted;

a lenticular lens; and a lenticular lens fitting frame formed to be frame-shaped, having said lenticular lens fitted on the front surface side and having a plurality of said assembled Fresnel lens fitting frames inserted from the back surface side.

* * * * *